United States Patent
Yang et al.

(10) Patent No.: US 8,144,290 B2
(45) Date of Patent: Mar. 27, 2012

(54) VIEWING ANGLE CONTROLLABLE LIQUID CRYSTAL DISPLAY

(75) Inventors: Yungshun Yang, Tainan (TW); Chienchih Huang, Tainan (TW)

(73) Assignee: Chimei Innolux Corporation (TW)

( * ) Notice: Subject to any disclaimer, the term of this patent is extended or adjusted under 35 U.S.C. 154(b) by 715 days.

(21) Appl. No.: 12/218,932

(22) Filed: Jul. 18, 2008

(65) Prior Publication Data

US 2009/0021657 A1    Jan. 22, 2009

(30) Foreign Application Priority Data

Jul. 20, 2007  (TW) ............................... 96126710 A

(51) Int. Cl.
*G02F 1/1335*  (2006.01)
(52) U.S. Cl. ........................................... 349/96; 349/18
(58) Field of Classification Search ................ 349/18, 349/96
See application file for complete search history.

(56) References Cited

U.S. PATENT DOCUMENTS

| | | | |
|---|---|---|---|
| 2005/0190329 A1* | 9/2005 | Okumura | 349/123 |
| 2009/0174843 A1* | 7/2009 | Sakai et al. | 349/74 |

* cited by examiner

*Primary Examiner* — Mark Robinson
*Assistant Examiner* — Jerry Blevins
(74) *Attorney, Agent, or Firm* — Trop, Pruner & Hu, P.C.

(57) ABSTRACT

One embodiment of the invention includes an LCD which comprises a back light module, a first polarizer, a second polarizer, an LCD panel, a first viewing angle controller and a third polarizer. The first polarizer and the second polarizer are disposed on the back light module and respectively have a first transparent axis and a second transparent axis which are perpendicular to each other. The LCD panel is disposed between the first polarizer and the second polarizer. The first viewing angle controller is disposed between the LCD panel and the second polarizer and has a first horizontal alignment liquid crystal layer. The third polarizer is disposed between the LCD panel and the first viewing angle controller and has a third transparent axis parallel to the second transparent axis.

23 Claims, 26 Drawing Sheets

VIEWING ANGLE CONTROLLABLE LIQUID CRYSTAL DISPLAY

CROSS-REFERENCE TO RELATED APPLICATION

Pursuant to 35 U.S.C. §119, this application claims priority to Taiwan Application Ser. No. 96126710, filed Jul. 20, 2007, the subject matter of which is incorporated herein by reference.

BACKGROUND

The present invention relates to a liquid crystal display (LCD) and, more particularly, to a viewing angle controllable LCD.

LCDs have the advantages of high definition, small volume, light weight, low driving voltage, low power consumption and wide application range. Thus, LCDs are widely used in consumer electronics or computers such as medium to small sized portable televisions (TVs), mobile phones, video recorders and players, notebook computers, desktop displays, displays in automobiles, and projection TVs and have generally become a popular choice for display devices, gradually replacing Cathode Ray Tubes (CRT). In recent years, the LCD market has significantly expanded, especially in applications of computers and notebook computers. Consequently, features such as wide area, high resolution, wide viewing angle, and quick reaction time play key roles when consumers evaluate the quality of an LCD.

Although a wide viewing angle is increasingly important when it comes to the functionality of an LCD, in certain situations an LCD with a wide viewing angle may not be ideal due to privacy concerns of a user. For example, an LCD with a wide viewing angle may allow more people to share a display image. Although this may be desirable with, for example, a television, a wide viewing angle may unfortunately allow unauthorized views of a display image, such as airplane passengers improperly viewing a laptop computer display of a co-passenger.

SUMMARY OF THE INVENTION

One embodiment of the present invention provides a viewing angle controllable LCD which comprises a back light module, a first polarizer, a second polarizer, an LCD panel, and a first viewing angle controller and a third polarizer. The first polarizer and the second polarizer are coupled to the back light module and respectively may have a first transparent axis and a second transparent axis which are perpendicular to each other. The LCD panel may be disposed between the first polarizer and the second polarizer. The first viewing angle controller may be disposed between the LCD panel and the second polarizer and may have a first homogenous horizontal alignment liquid crystal layer. The third polarizer may be disposed between the LCD panel and the first viewing angle controller and may have a third transparent axis parallel to the second transparent axis.

Another embodiment of the present invention may provide a viewing angle controllable LCD which comprises a back light module, a first polarizer, a second polarizer, an LCD panel, a first viewing angle controller, a third polarizer, and a fourth polarizer. The first polarizer and the second polarizer may be disposed on the back light module and respectively have a first transparent axis and a second transparent axis which form an acute angle with one another. The LCD panel may be disposed between the first polarizer and the second polarizer. The first viewing angle controller may be disposed between the LCD panel and the second polarizer and may have a first homogenous horizontal alignment liquid crystal layer. The third polarizer may be disposed between the LCD panel and the first viewing angle controller and have a third transparent axis parallel to the second transparent axis. The fourth polarizer may be disposed between the LCD panel and the third polarizer and have a fourth transparent axis perpendicular to the first transparent axis.

According to certain embodiments described herein, the technical features of the present invention lie in, for example only, the use of at least one viewing angle controller comprising a homogenous horizontal alignment liquid crystal layer on one side of the LCD panel and at least two polarizers which are disposed respectively on the two sides of the viewing angle controller and whose transparent axes are parallel to each other. Then, at least one electric field is applied to the homogenous horizontal alignment liquid crystal layer of the viewing angle controller to make the liquid crystal molecules, whose director axes are parallel to the substrate, tilt (in the vertical plane) so their director axes are no longer parallel to the substrate but are also not yet perpendicular to the substrate (i.e., generally vertical). For example, the liquid crystal molecules may rotate or tilt 45° in the vertical plane. When the liquid crystal axes form an acute angle with the substrate, the incident light that enters into the viewing angle controller at a perpendicular angle does not generate a phase delay and passes the polarizer on the other side of the viewing angle controller. On the other hand, the incident light that does not enter into the viewing angle controller at a perpendicular angle generates a phase delay and cannot pass the polarizer on the other side of the viewing angle controller. Thus, the viewing angle narrows and is controlled according to the filtration of the incident light that did not enter the controller at a perpendicular angle. As a result, this solves or at least partially remedies the problem of the conventional technology that arises from the conflict between a wide viewing angle and the issue of user privacy.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In order to make the above and other objects, features and advantages of the present invention more comprehensible, several embodiments accompanied with figures are described in detail below.

Figure 1A:
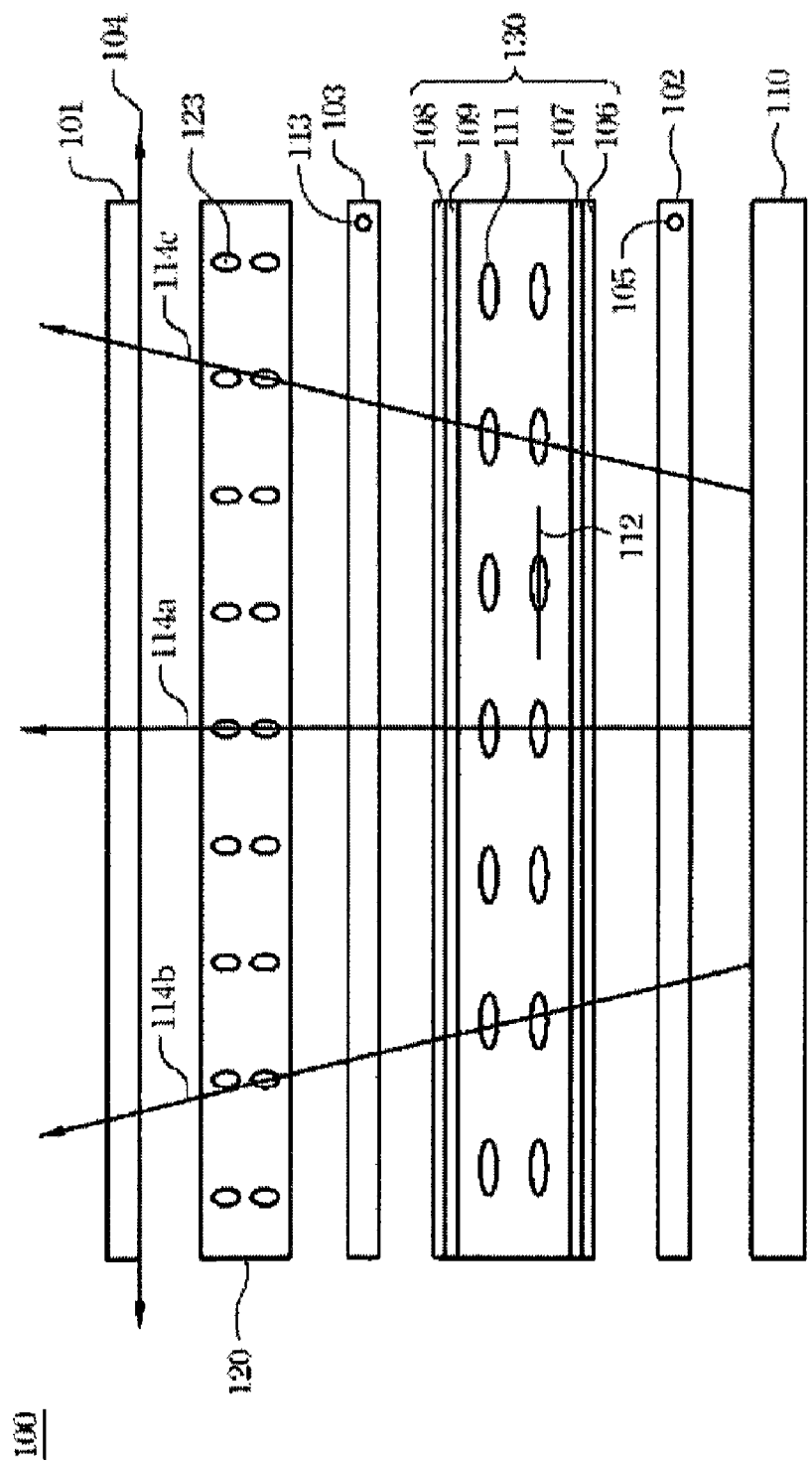
FIG. 1A is a schematic cross-sectional view of an LCD according to the first embodiment of the present invention.

For the purpose of clear illustrations, the components in the diagrams are not drawn to scale. In different diagrams, reference numerals may be repeatedly used to denote corresponding or similar components.

DETAILED DESCRIPTION

It is desirable to provide a viewing angle adjustable (i.e., controllable) LCD that allows for choosing or adjusting of the viewing angle of a display image according to operation requirement.

Several embodiments of a viewing angle adjustable LCD are described in detail below. It should be noted that the embodiments are for the purpose of illustrating the present invention and are not intended to limit the scope and spirit of the present invention.

Figure 1B:
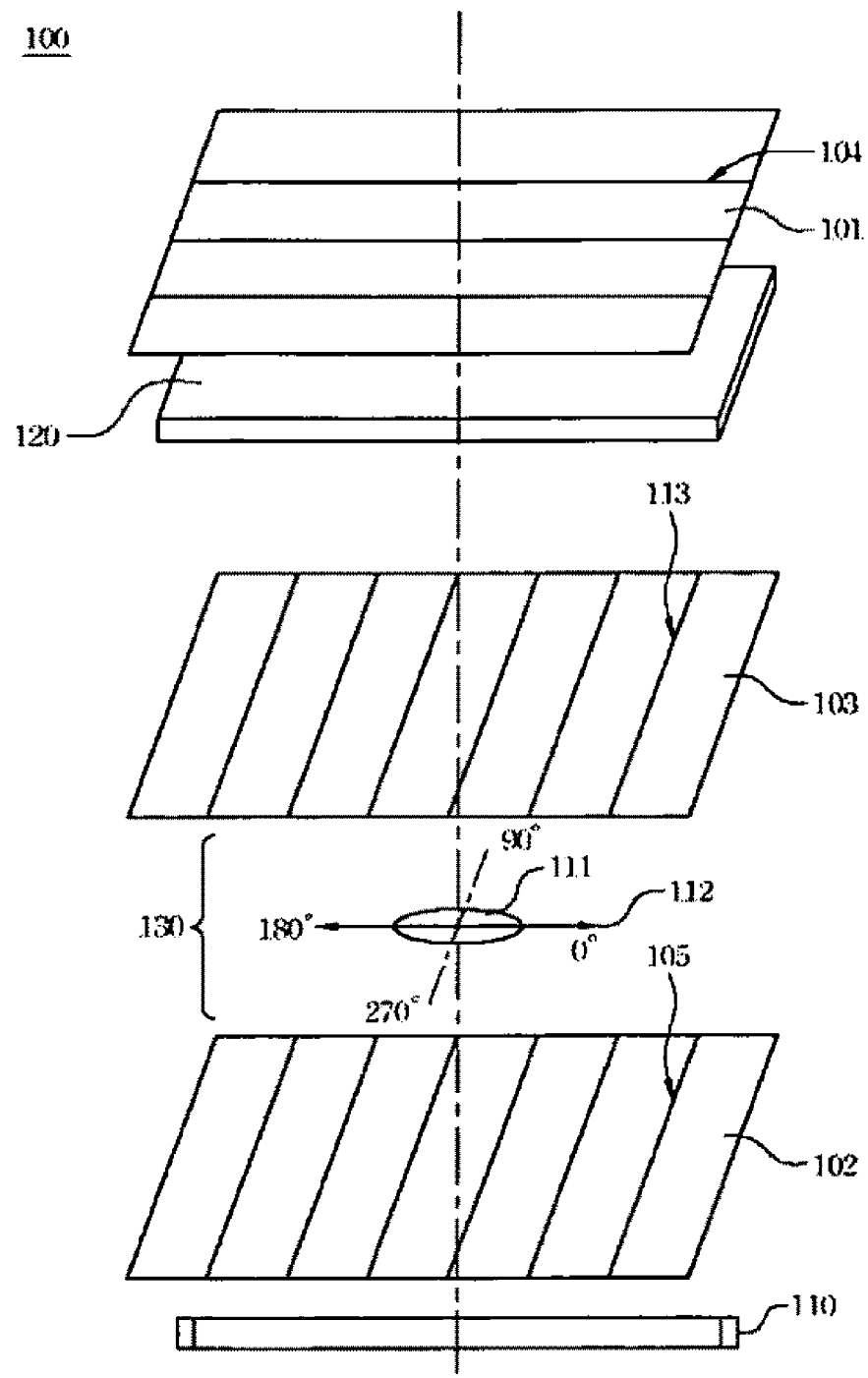
FIG. 1B is a decomposition diagram of the LCD of FIG. 1A.

FIG. 1A is a schematic cross-sectional view of an LCD 100 according to the first embodiment of the present invention. FIG. 1B is a decomposition diagram of the structure of the LCD 100.

According to some embodiments, a viewing angle controllable LCD 100 comprises a back light module 110, a first polarizer 101, a second polarizer 102, an LCD panel 120, a first viewing angle controller 130 and a third polarizer 103. In the present embodiment, the second polarizer 102, the first viewing angle controller 130, the third polarizer 103, the LCD panel 120, and the first polarizer 101 are stacked on top of the back light module 110 in sequence.

The first polarizer 101 is disposed on the back light module 110 and has a first transparent polarization axis 104, wherein "transparent polarization axis", "transparent axis" and "polarization axis" are used interchangeably herein to indicate the main axis of polarization. The second polarizer 102 is disposed between the back light module 110 and the first polarizer 101 and has a second transparent polarization axis 105, which is perpendicular (i.e., generally perpendicular) to the first transparent axis 104.

The LCD panel 120 is disposed between the first polarizer 101 and the second polarizer 102. The LCD panel 120 is filled with a liquid crystal layer 123 which may be horizontal alignment liquid crystal, vertical alignment liquid crystal, twist nematic liquid crystal, or other liquid crystal display technologies. In the present embodiment, the liquid crystal layer 123 may be a multi-domain vertical alignment (MVA) liquid crystal layer.

A first viewing angle controller 130 is disposed between the LCD panel 120 and the second polarizer 102 and comprises a first substrate 106, a first electrode 107, a second substrate 108, a second electrode 109, and a first liquid crystal layer 111 which is located between the first substrate 106 and the second substrate 108. The first liquid crystal layer 111 may be, for example, a homogenous horizontal alignment liquid crystal layer. The director axes 112 of the liquid crystal molecules of the first liquid crystal layer 111 are generally parallel to the first substrate 106. The director axis indicates the average orientation axis of the liquid crystal molecules. The first electrode 107 and the second electrode 109 are respectively disposed on the first substrate 106 and the second substrate 108 to drive the first liquid crystal layer 111.

In an embodiment of the present invention, the axes 112 of the liquid crystal molecules of the first liquid crystal layer 111 are not only parallel to the first substrate 106 but also generally perpendicular to the second transparent axis 105. The third polarizer 103 is disposed between the LCD panel 120 and the first viewing angle controller 130 and has a third transparent polarization axis 113 parallel to the second transparent axis 105. When no voltage is applied to the first liquid crystal layer 111, the axes 112 are generally perpendicular to the second transparent axis 105 so incident lights, which are perpendicularly entered 114a or not perpendicularly entered 114b, 114c into the first liquid crystal layer 111 may all pass through the third polarizer 103 and emit to the LCD panel 120.

Figure 1C:
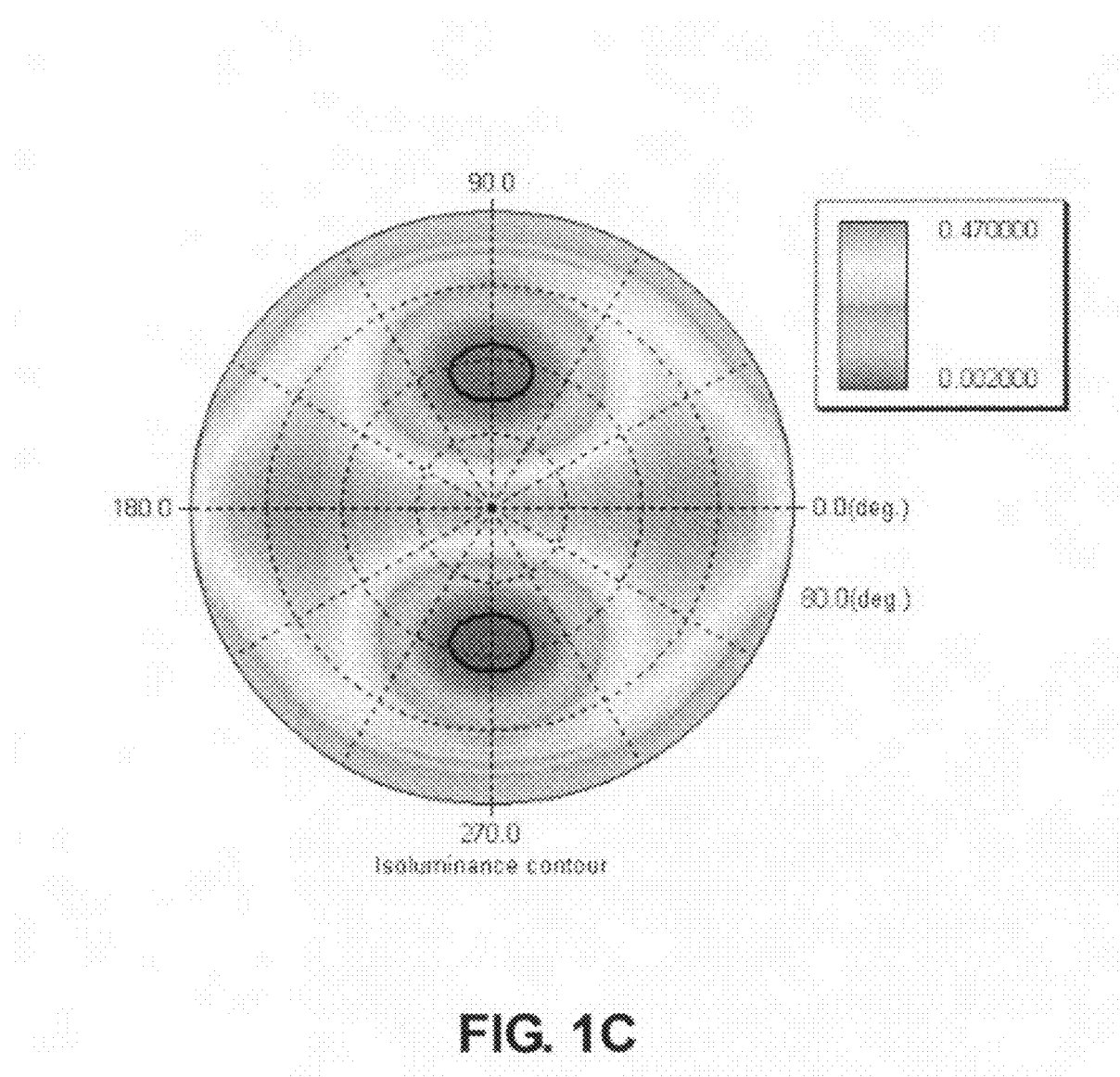
FIG. 1C is an isoluminance contour diagram of the LCD of FIG. 1A when a voltage is applied to the first homogenous liquid crystal layer.

FIG. 1C is an isoluminance contour diagram for the LCD 100 when a voltage is applied to the first liquid crystal layer 111. As shown in FIG. 1C, when the first electrode 107 and the second electrode 109 apply a voltage to the first liquid crystal layer 111, the director axes 112 of the liquid crystal molecules tilt in an angle with respect to the substrate 106 (i.e., tilt or rotate in the vertical plane). With the voltage applied, the axes 112 tilt away from being parallel to the substrate 106 (i.e., away from the horizontal plane) and towards being perpendicular to substrate 106 (i.e, vertically oriented) without necessarily attaining an orientation that is perpendicular to substrate 106. In other words, axes 112 tilt in an acute angle (e.g., 20°, 45°, 70°) with respect to the horizontal plane, wherein an acute angle is less than 90°. The director axes may maintain their orientation generally perpendicular to the second transparent axis 105 but maintain their orientation in the horizontal plane along the 0° and 180° direction. As a result, the incident lights 114b and 114c which pass through the second polarizer 102 and are not perpendicularly entered into the first liquid crystal layer 111 generate a phase delay and cannot pass through the third polarizer 103. Only the incident light 114a perpendicularly enters into the first liquid crystal layer 111 and experiences no phase shift or limited phase shift and may pass through the third polarizer 103 and emit to the LCD panel 120. Consequently, the viewing angle on the top and bottom orientation and the brightness (due to, for example, multi-domain vertical alignment liquid crystal 120) of the LCD 100 (as shown in FIG. 1B with orientation at 90° and 270° representing top and bottom orientation, respectively) are limited or pinched according to the magnitude of axes 112 tilt and field magnitude.

Figure 2A:
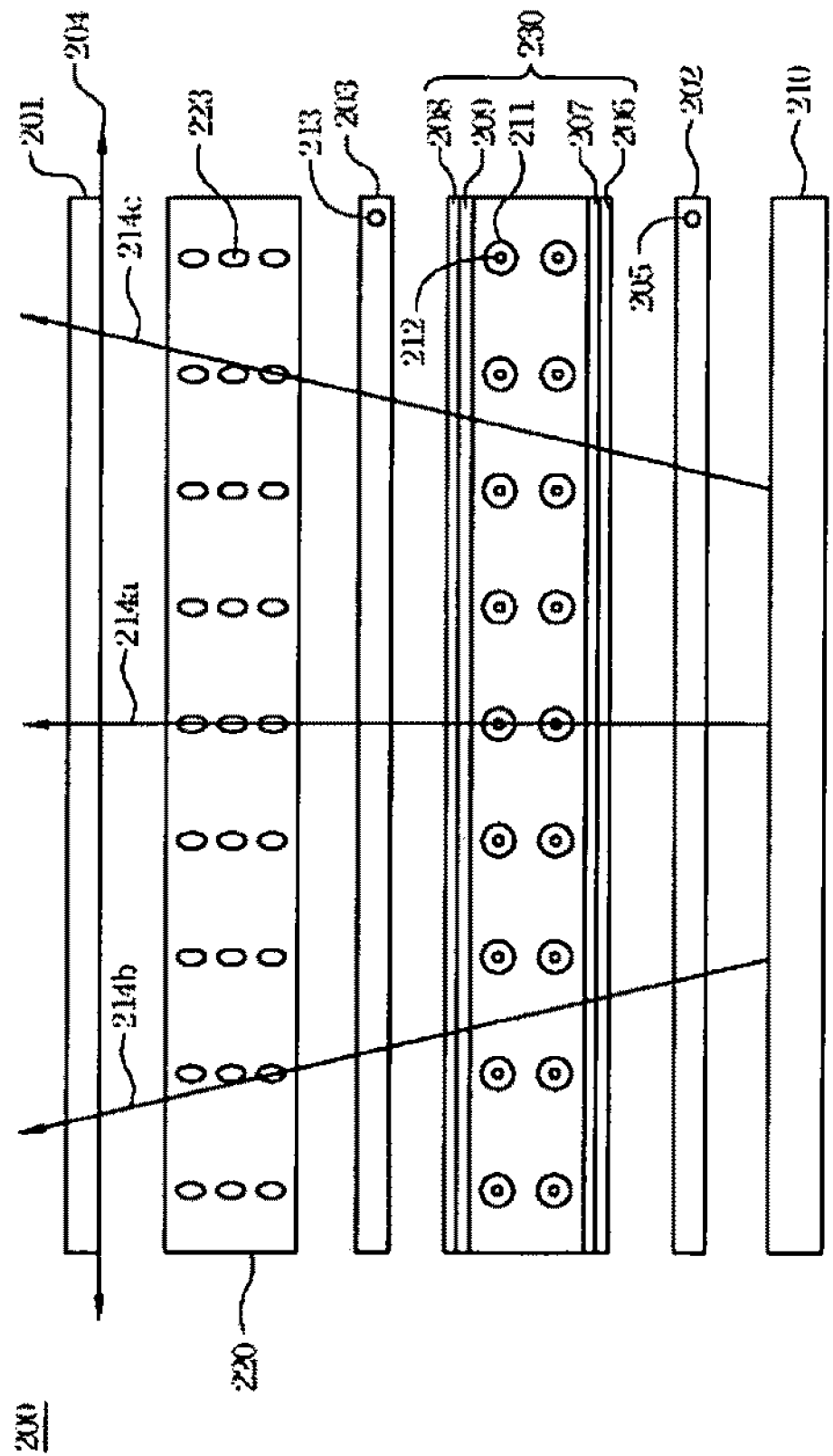
FIG. 2A is a schematic cross-sectional view of an LCD according to the second embodiment of the present invention.
Figure 2B:
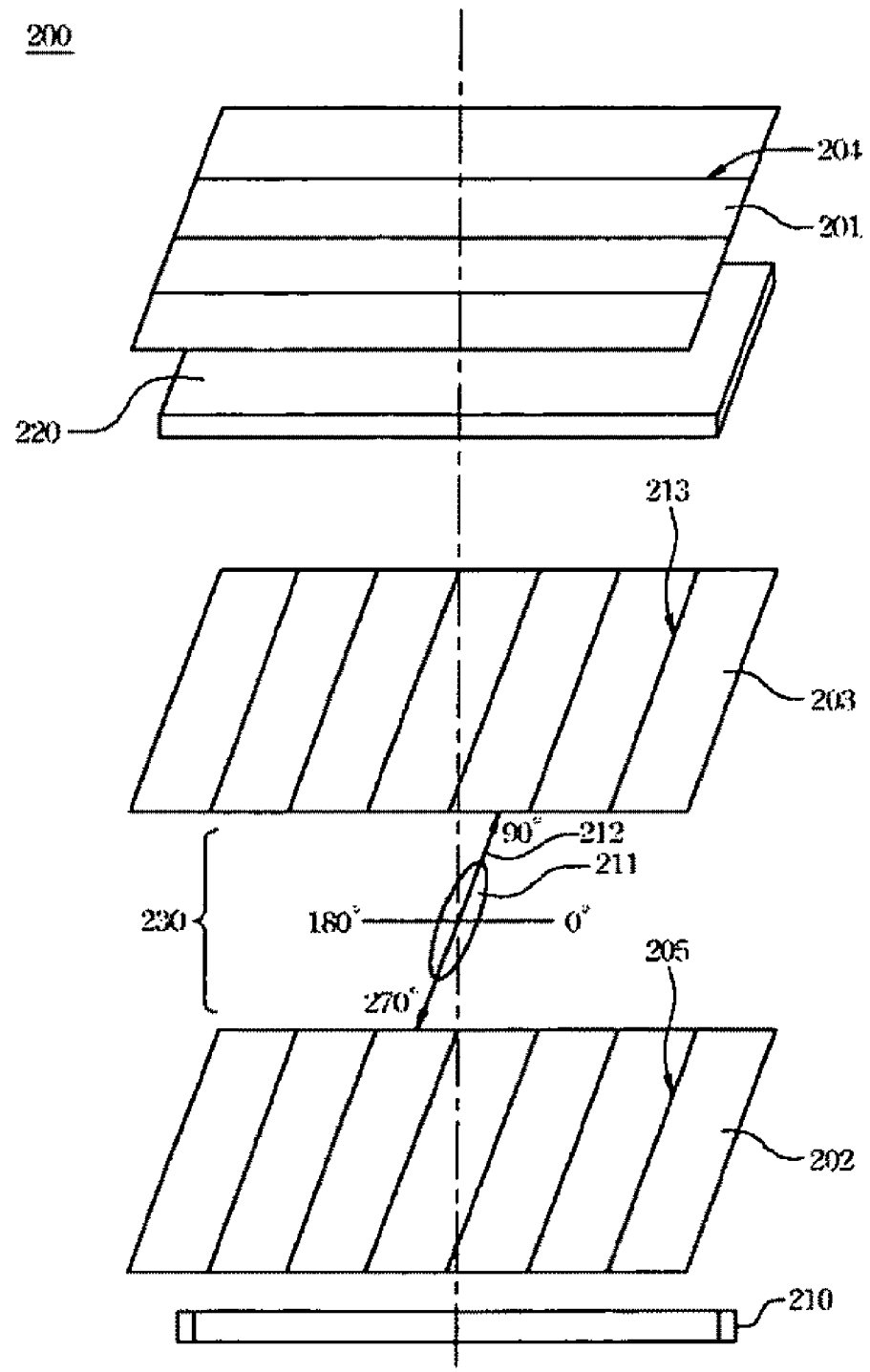
FIG. 2B is a decomposition diagram of the LCD of FIG. 2A.

Referring to FIG. 2A and FIG. 2B, FIG. 2A is a schematic cross-sectional view of an LCD 200 according to a second embodiment of the present invention. FIG. 2B is a decomposition diagram of the structure of the LCD 200. The structure of the LCD 200 is similar to the structure of the LCD 100 but a difference is the alignment of the axes of the liquid crystal molecules of the first liquid crystal layer in the first viewing angle controller.

The viewing angle controllable LCD 200 comprises a back light module 210, a first polarizer 201, a second polarizer 202, an LCD panel 220, a first viewing angle controller 230 and a third polarizer 203. In the present embodiment, the second polarizer 202, the first viewing angle controller 230, the third polarizer 203, the LCD panel 220, and the first polarizer 201 are stacked on top of the back light module 210 in sequence.

The first polarizer 201 is disposed on the back light module 210 and has a first transparent polarization axis 204. The second polarizer 202 is disposed between the back light module 210 and the first polarizer 201 and has a second transparent polarization axis 205, which is perpendicular to the first transparent axis 204. The LCD panel 220 is disposed between the first polarizer 201 and the second polarizer 202. Refer to the first embodiment for a detailed discussion of the LCD panel 220, whose common features will not be further described herein.

The structure of the first viewing angle controller 230 is similar to that in the first embodiment and comprises a first substrate 206, a first electrode 207, a second substrate 208, a second electrode 209, and a first liquid crystal layer 211. A difference is that the director axes 212 of the liquid crystal molecules of the first liquid crystal layer 211 are generally parallel to the second transparent polarization axis 205. The third polarizer 203 is disposed between the LCD panel 220 and the first viewing angle controller 230 and has a third transparent polarization axis 213 parallel to the second transparent axis 205. When no voltage is applied to the first liquid crystal layer 211, the axes 212 are generally parallel to the substrate and second transparent axis 205 (i.e., align in the horizontal plane along the 90° and 270° orientation) so incident lights, which are perpendicularly 214a or not perpendicularly 214b, 214c entered into the first liquid crystal layer 211 may all pass through the third polarizer 203 and emit to the LCD panel 220.

Figure 2C:
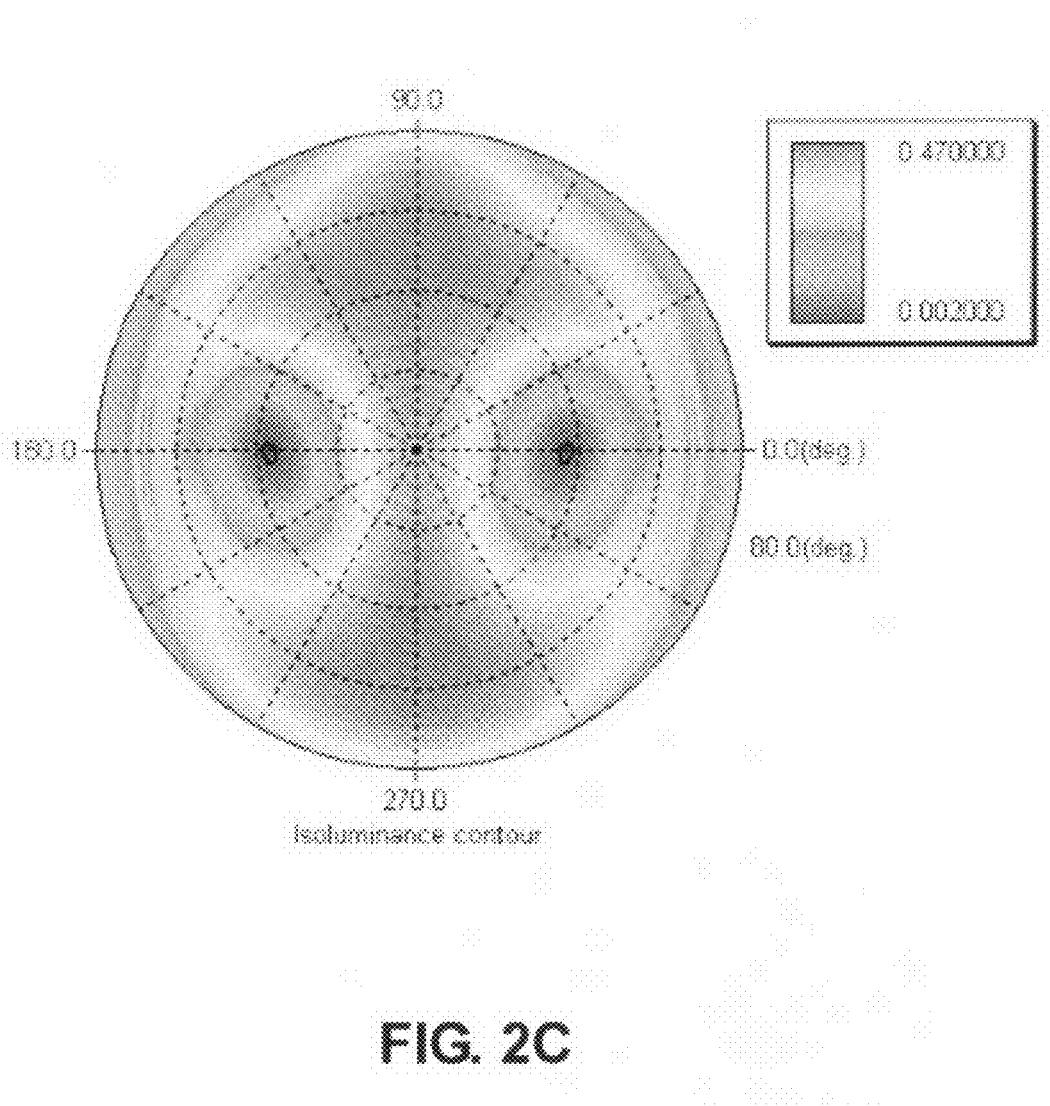
FIG. 2C is an isoluminance contour diagram of the LCD of FIG. 2A when a voltage is applied to the first homogenous liquid crystal layer.

FIG. 2C is an isoluminance contour diagram of the LCD 200 when a voltage is applied to the first homogenous liquid crystal layer 211. When the first electrode 207 and the second electrode 209 apply a voltage to the first liquid crystal layer 211, the director axes 212 of the liquid crystal molecules of the first liquid crystal layer 211 would tilt in an angle with respect to the first substrate 206 (i.e., vertically). As a result, the incident lights 214b and 214c which pass through the second polarizer 202 and are not perpendicularly entered into the first liquid crystal layer 211 generate a phase delay and cannot pass through the third polarizer 203. Only the incident light 214a that perpendicularly enters into the rotated director axes 212 of first liquid crystal layer 211 may pass through the third polarizer 203 and emit to the LCD panel 220. Consequently, the viewing angle from left and right and the brightness of the LCD 200 (as shown in FIG. 2B with orientation angles of 0° and 180° representing right and left orientations, respectively) are limited.

It may be understood from the first and the second embodiments, when no voltage is applied to the first liquid crystal layer, the axes of the liquid crystal molecules of the first liquid crystal layer in the first viewing angle controller are perpendicular or parallel to the transparent axes of the polarizers on the two sides so incident lights which are perpendicularly or not perpendicularly entered into the viewing angle controller may all pass through the third polarizer and emit to the LCD panel. On the other hand, when a voltage is applied to the first liquid crystal layer, the axes of the liquid crystal molecules of the first liquid crystal layer would tilt in an angle with respect to the first substrate. As a result, the incident light which pass through the second polarizer and are not perpendicularly entered into the first liquid crystal layer generate a phase delay and cannot pass through the third polarizer. Only the incident light that perpendicularly enters into the first viewing angle controller may pass through the third polarizer and emit to the LCD panel. Furthermore, the alignment direction of the first liquid crystal layer determines the viewing angle that will be limited. For example, if the alignment direction of the first liquid crystal layer is 90° and 270° (as shown in FIG. 2B), the limited viewing angle is left and right orientations (i.e. 0° and 180° in FIG. 2B). On the other hand, if the alignment direction of the first liquid crystal layer is 0° and 180° (as shown in FIG. 1B), the limited viewing angle is top and bottom orientations (i.e. 90° and 270° in FIG. 1B).

Figure 3A:
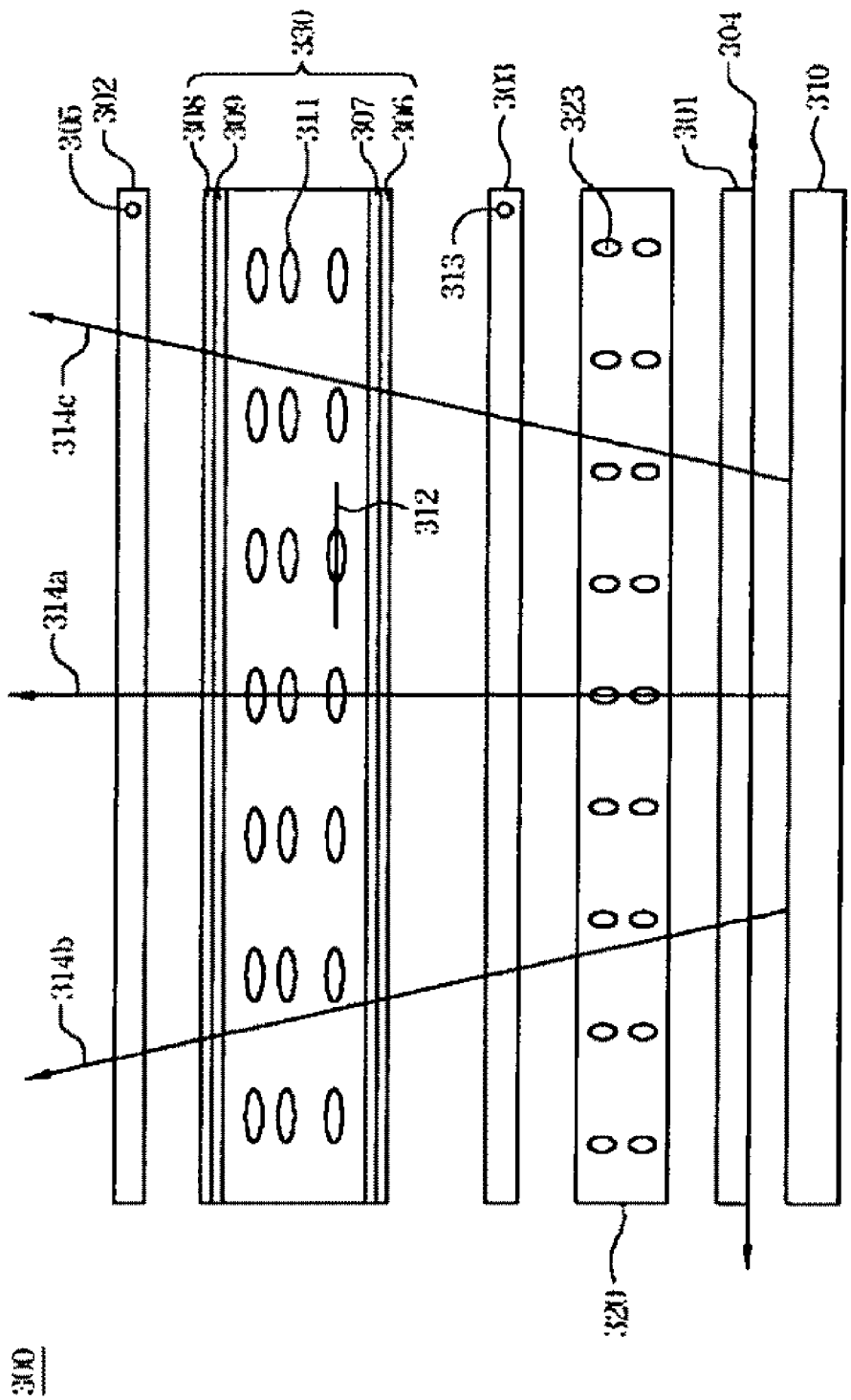
FIG. 3A is a schematic cross-sectional view of an LCD according to the third embodiment of the present invention.
Figure 3B:
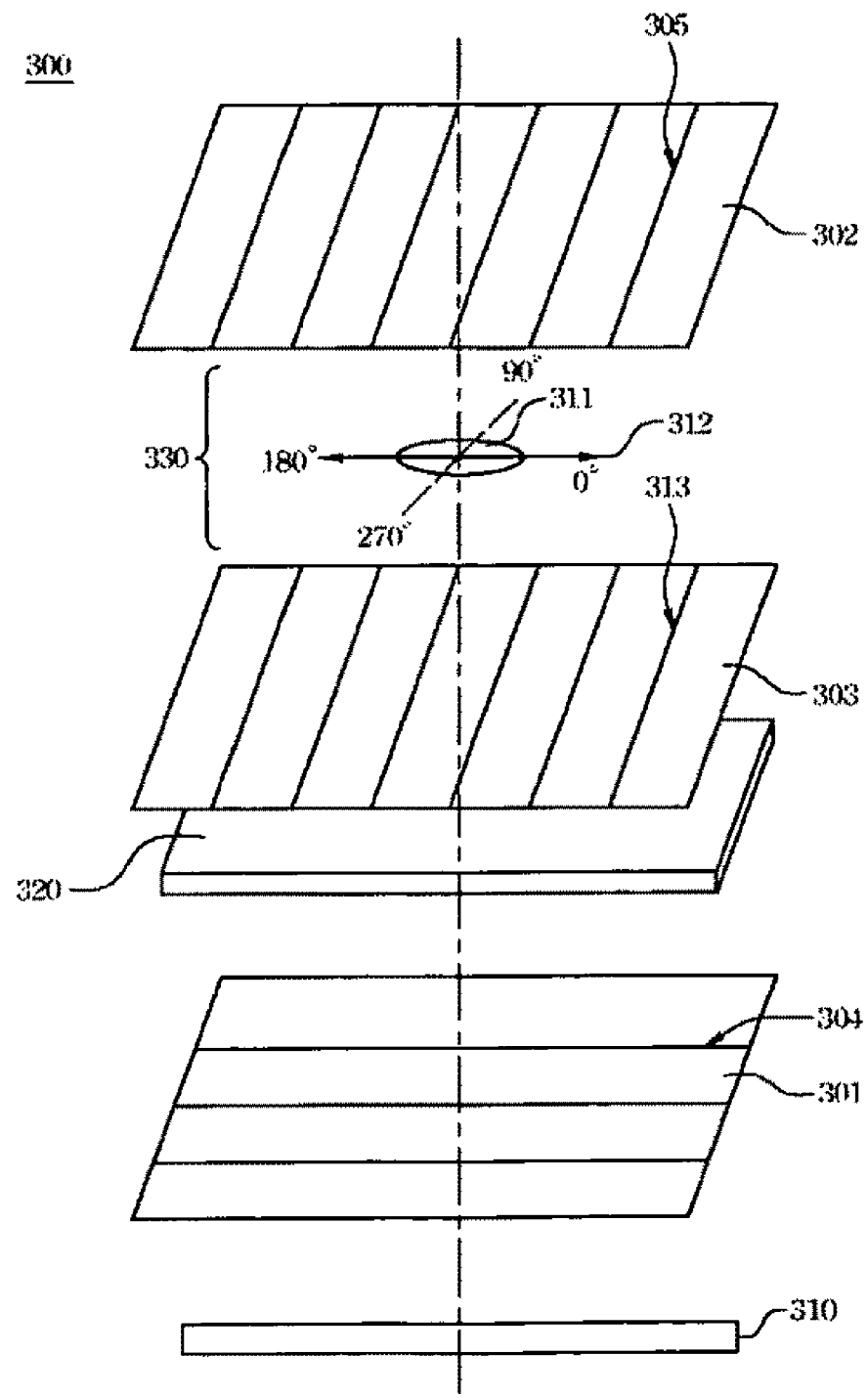
FIG. 3B is a decomposition diagram of the LCD of FIG. 3A.

Referring to FIG. 3A and FIG. 3B, FIG. 3A is a schematic cross-sectional view of an LCD 300 according to a third embodiment of the present invention. FIG. 3B is a decomposition diagram on the structure of the LCD 300. The structure of the LCD 300 is similar to the structure of the LCD 100. A difference is the relative relationship among the first viewing angle controller, the LCD, and the back light module.

The viewing angle controllable LCD 300 comprises a back light module 310, a first polarizer 301, a second polarizer 302, an LCD panel 320, a first viewing angle controller 330 and a third polarizer 303. In the present embodiment, the first polarizer 301, the LCD 320, the third polarizer 303, the first viewing angle controller 330, and the second polarizer 302 are stacked on top of the back light module 310 in sequence.

The first polarizer 301 and the second polarizer 302 are both disposed on the back light module 310 and respectively have a first transparent axis 304 and a second transparent axis 305. The first polarizer 301 is disposed between the back light module 310 and the second polarizer 302. The first transparent axis 304 and the second transparent axis 305 are perpendicular to each other.

The LCD panel 320 is disposed between the first polarizer 301 and the second polarizer 302. Refer to the first embodiment for discussion of the LCD panel 320, which will not further described herein.

The first viewing angle controller 330 is disposed between the LCD panel 320 and the second polarizer 302. The structure of the first viewing angle controller 330 is similar to that in the first embodiment and comprises a first substrate 306, a first electrode 307, a second substrate 308, a second electrode 309, and a first liquid crystal layer 311. Axes 312 of the liquid crystal molecules of the first liquid crystal layer 311 with horizontal alignment may be perpendicular (illustrated as an example in the present embodiment) or parallel to the second transparent axis 305.

The third polarizer 303 is disposed between the LCD panel 320 and the first viewing angle controller 330 and has a third transparent axis 313 parallel to the second transparent axis 305.

When the first electrode 307 and the second electrode 309 apply a voltage to the first liquid crystal layer 311, the axes 312 of the liquid crystal molecules would tilt in an angle with respect to the first substrate 306 (i.e., tilt vertically). As a result, incident lights 314b and 314c which pass through the third polarizer 303 and are not perpendicularly entered into the first liquid crystal layer 311 generate a phase delay and cannot pass through the second polarizer 302. Only an incident light 314a that perpendicularly enters into the first liquid crystal layer 311 may pass through the second polarizer 302 and emit to the view direction of the user. Consequently, the viewing angle from top and bottom and the brightness of the LCD 300 (as shown in FIG. 3B at orientation of 90° and 270° representing top and bottom orientations, respectively) are limited.

A difference between the first embodiment and the third embodiment lies in the relative relationship among the viewing angle controller, the LCD and the back light module. In the first embodiment, the viewing angle controller is disposed between the LCD and the back light module, while in the third embodiment; the LCD is disposed between the viewing angle controller and the back light module. The transparent axes of the two polarizers next to the two sides of the viewing angle controller are parallel to each other.

Figure 4A:
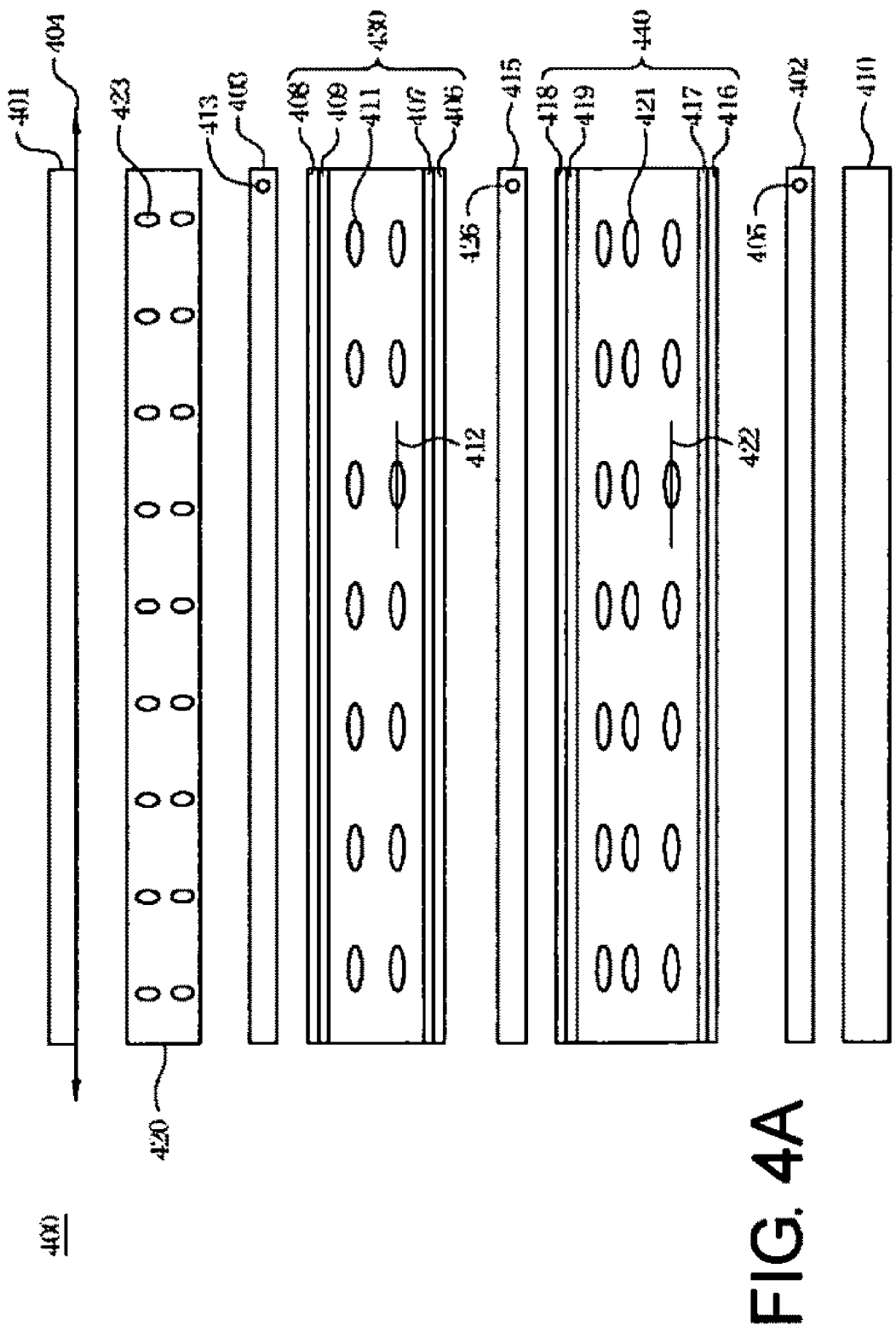
FIG. 4A is a schematic cross-sectional view of an LCD according to the fourth embodiment of the present invention.
Figure 4B:
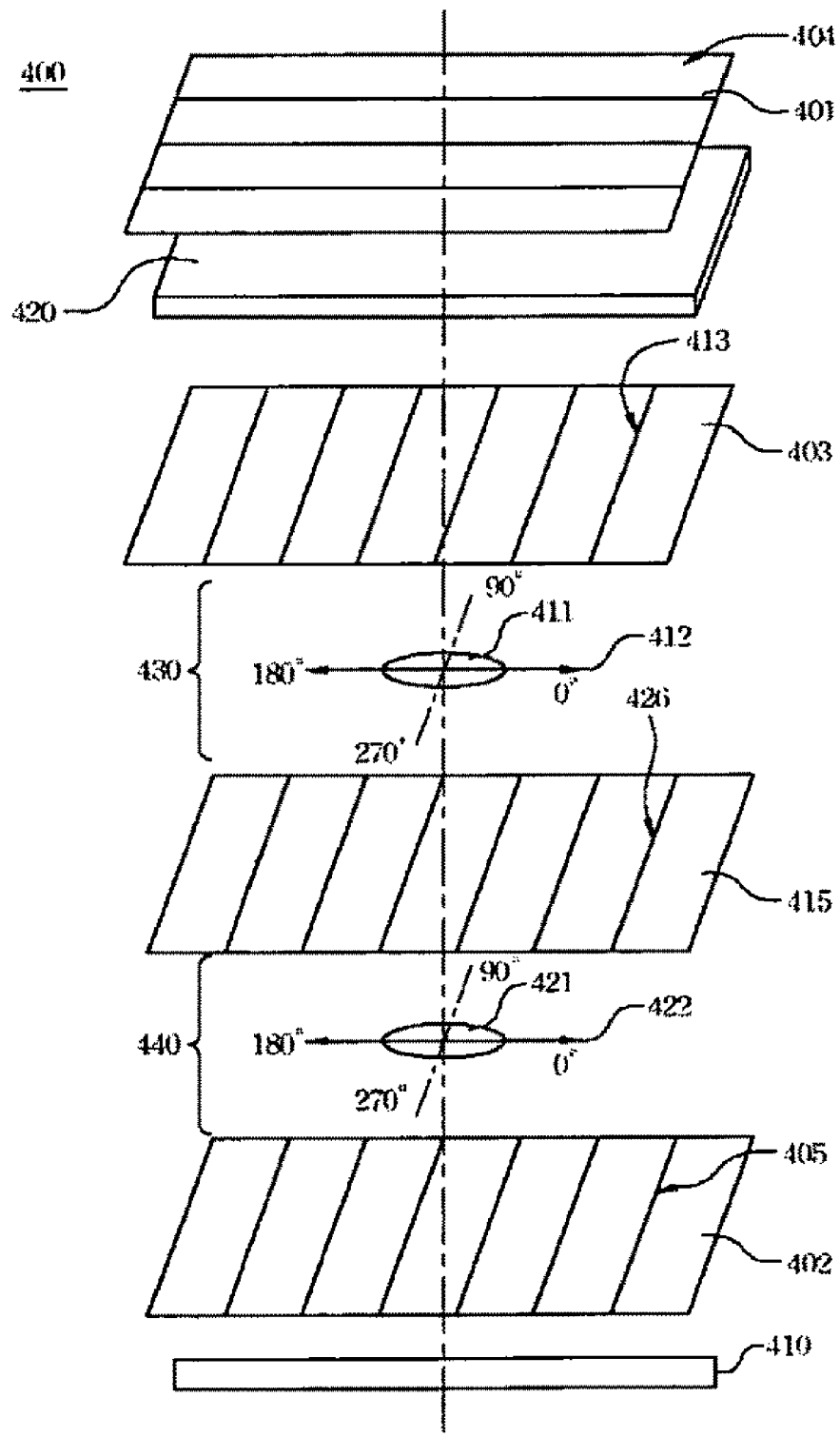
FIG. 4B is a decomposition diagram of the LCD of FIG. 4A.

Referring to FIG. 4A and FIG. 4B, FIG. 4A is a schematic cross-sectional view of an LCD 400 according to the fourth embodiment of the present invention. FIG. 4B is a decomposition diagram on the structure of the LCD 400.

The LCD 400 comprises a first viewing angle controller, an LCD panel, and a back light module in addition to a second viewing angle controller.

The viewing angle controllable LCD 400 comprises a back light module 410, a first polarizer 401, a second polarizer 402, an LCD panel 420, a first viewing angle controller 430, a third polarizer 403, a fourth polarizer 415, and a second viewing angle controller 440. In the present embodiment, the second polarizer 402, the second viewing angle controller 440, the fourth polarizer 415, the first viewing angle controller 430, the third polarizer 403, the LCD panel 420, and the first polarizer 401 are stacked on top of the back light module 410 in sequence.

The first polarizer 401 is disposed on the back light module 410 and has a first transparent axis 404. The second polarizer 402 is disposed between the back light module 410 and the first polarizer 401 and has a second transparent axis 405, which is perpendicular to the first transparent axis 404.

The LCD panel 420 is disposed between the first polarizer 401 and the second polarizer 402. Refer to the first embodiment for discussion of the LCD panel 420, which will not further described herein.

The first viewing angle controller 430 is disposed between the LCD panel 420 and the second polarizer 402. The second viewing angle controller 440 is disposed between the second polarizer 402 and the first viewing angle controller 430. The structures of the first viewing angle controller 430 and the second viewing angle controller 440 are similar to those in the first embodiment. The first viewing angle controller 430 comprises a first substrate 406, a first electrode 407, a second substrate 408, a second electrode 409, and a first liquid crystal layer 411. The second viewing angle controller 440 comprises a third substrate 416, a third electrode 417, a fourth substrate 418, a fourth electrode 419, and a second liquid crystal layer 421.

The third polarizer 403 is disposed between the LCD panel 420 and the first viewing angle controller 430 and has a third transparent axis 413 parallel to the second transparent axis 405. The fourth polarizer 415 is disposed between the first viewing angle controller 430 and the second viewing angle controller 440 and has a fourth transparent axis 426 parallel to the second transparent axis 405. In an embodiment of the present invention, the liquid crystal molecules of the first liquid crystal layer 411 and the second liquid crystal layer 421 respectively have first axes 412 and second axes 422, which are all parallel (not shown in FIG. 4A) or all perpendicular to the second transparent axis 405. In the present embodiment, the first axes 412 and the second axes 422 are generally perpendicular to the second transparent axis 405.

Figure 5A:
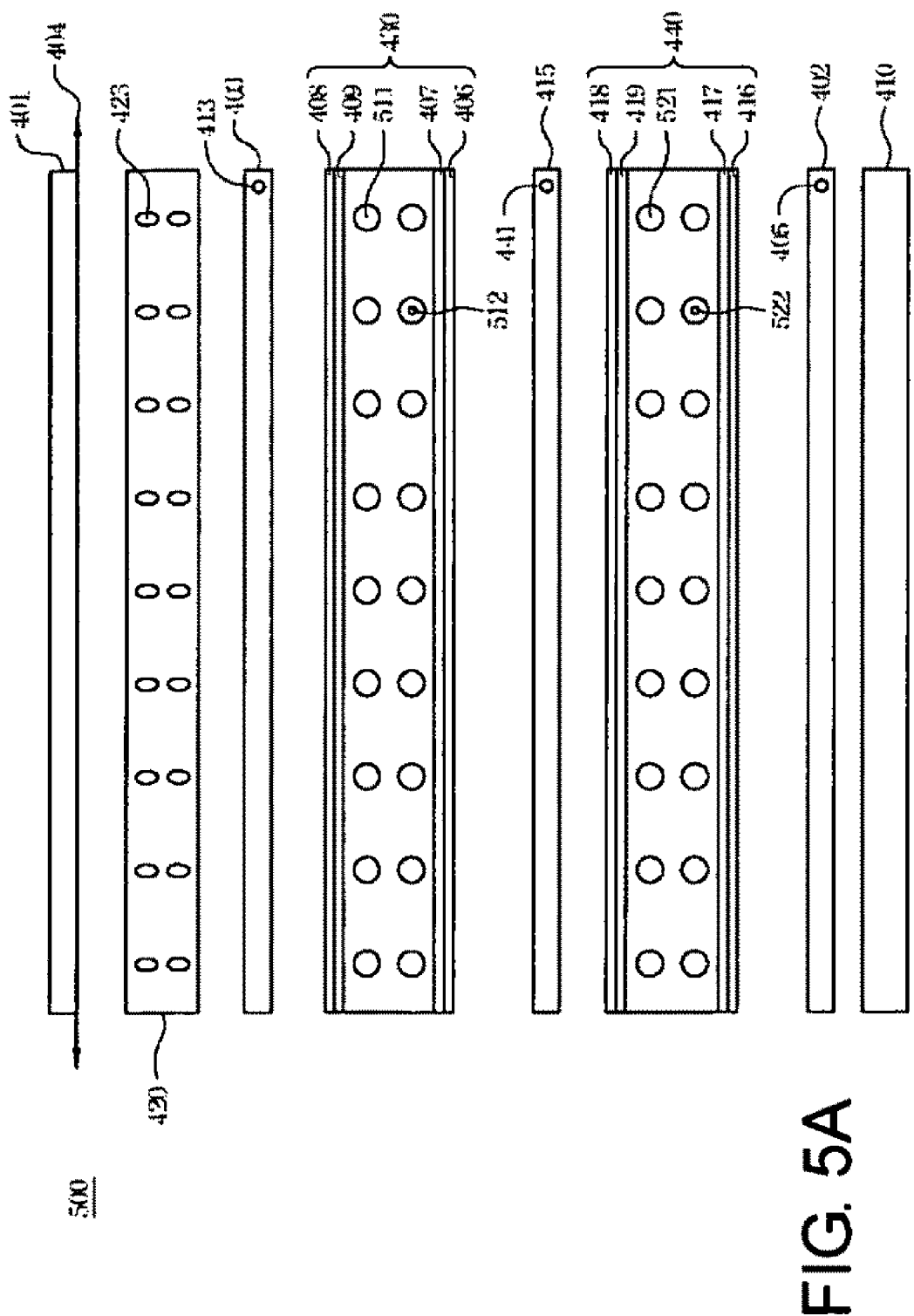
FIG. 5A is a schematic cross-sectional view of an LCD according to the fifth embodiment of the present invention.
Figure 5B:
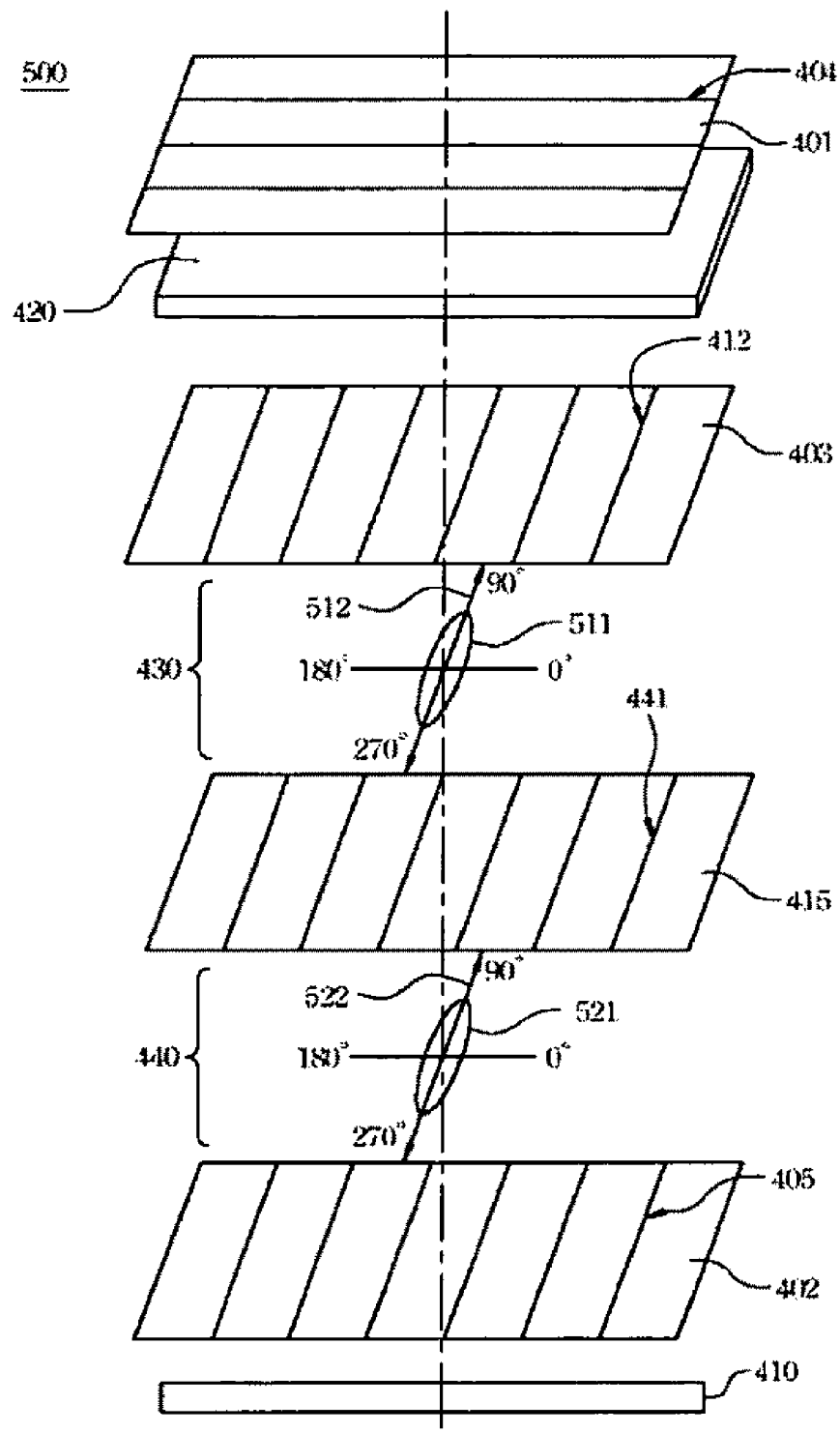
FIG. 5B is a decomposition diagram of the LCD of FIG. 5A.

Referring to FIG. 5A and FIG. 5B, FIG. 5A is a schematic cross-sectional view of an LCD 500 according to a fifth embodiment of the present invention. The structure in the fifth embodiment is similar to that in the fourth embodiment. A difference between the LCD 500 and the LCD 400 is the alignment direction of the first liquid crystal layer and the second liquid crystal layer. First axes 512 of the liquid crystal molecules of the first liquid crystal layer 511 and second axes 522 of the liquid crystal molecules of the second liquid crystal layer 521 are generally parallel to the second transparent axis 405. In FIG. 5A and FIG. 5B, the same components as those in the fourth embodiment are denoted by the same numerals.

Figure 6A:
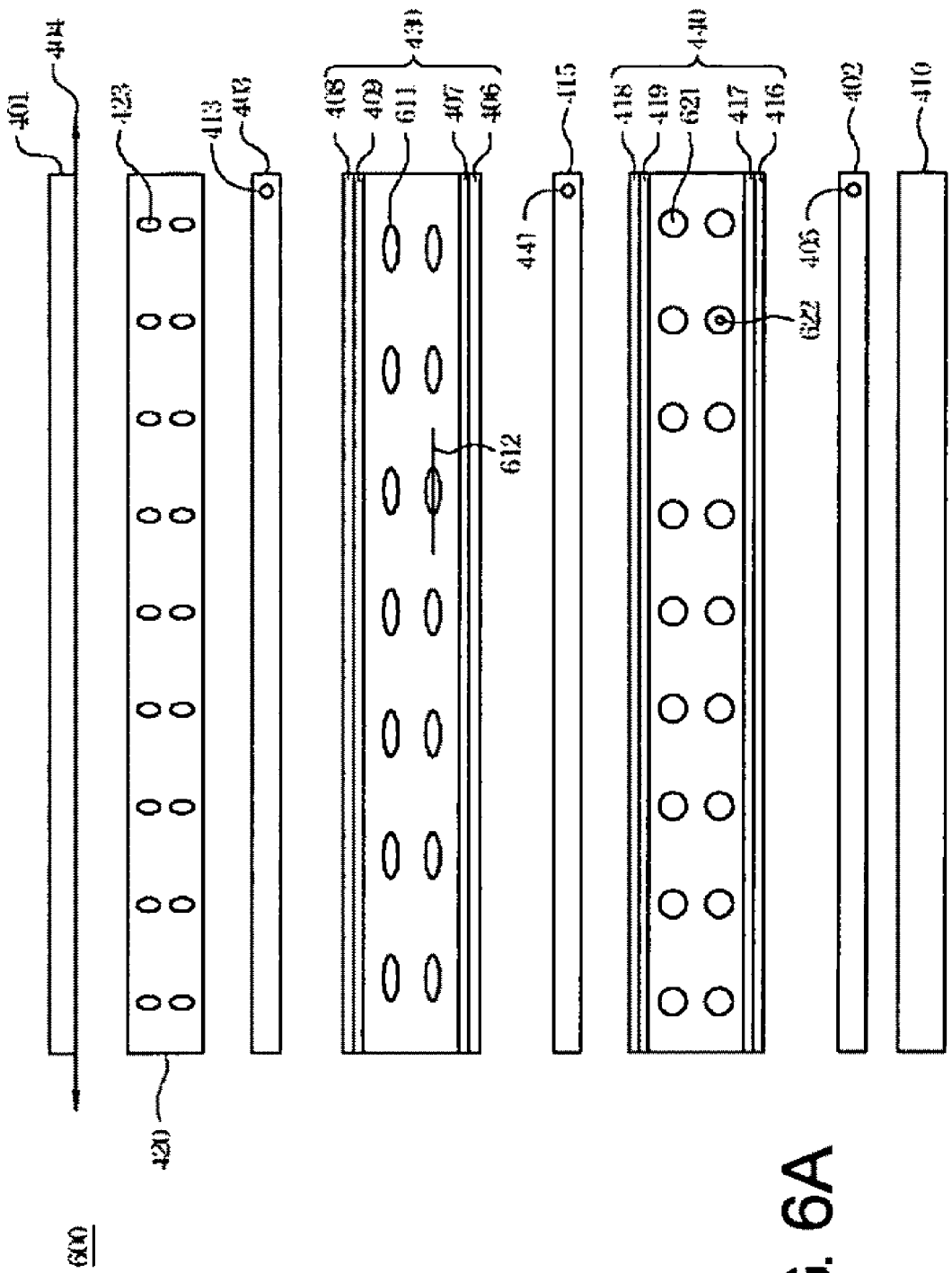
FIG. 6A is a schematic cross-sectional view of an LCD according to the sixth embodiment of the present invention.
Figure 6B:
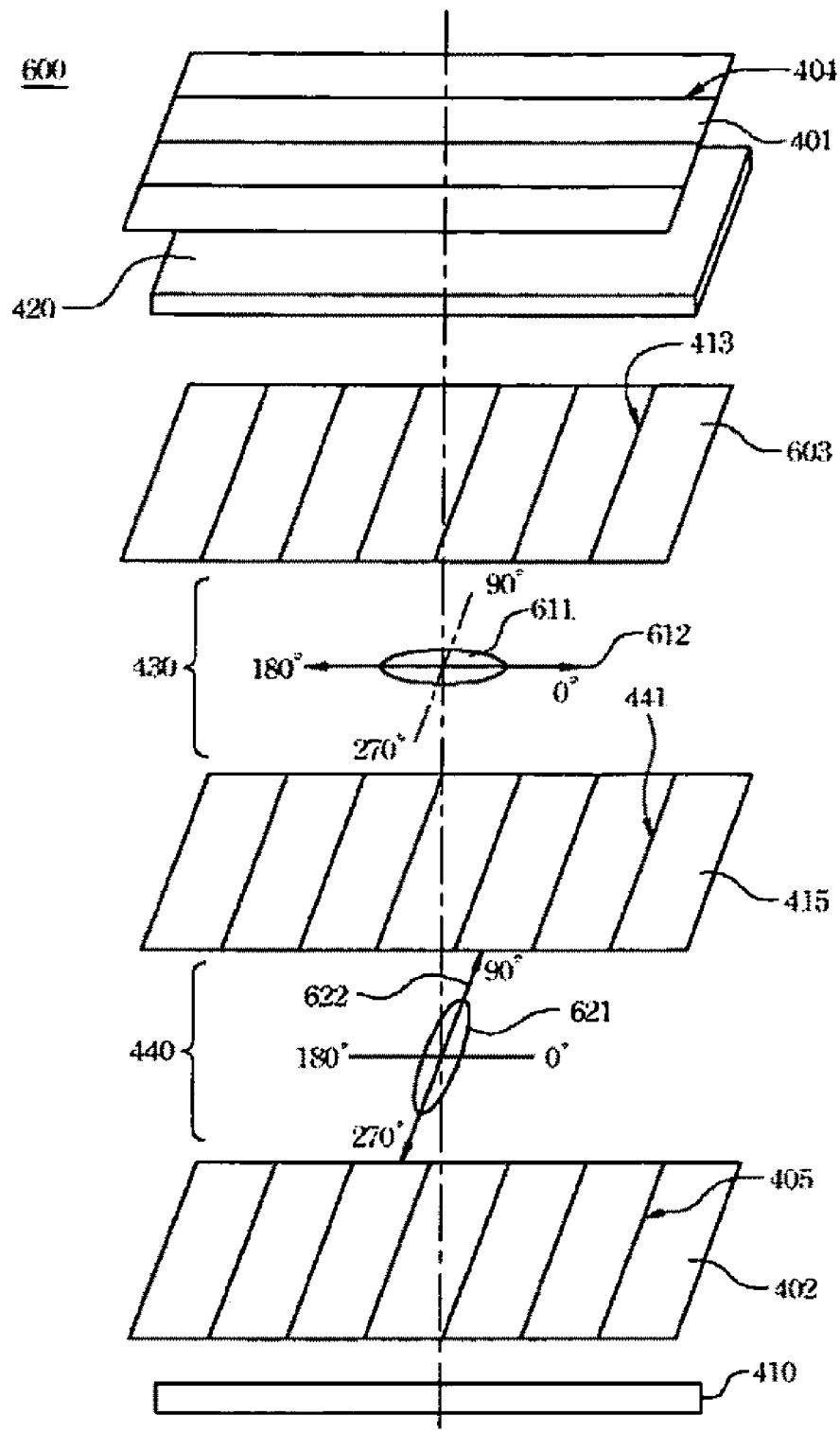
FIG. 6B is a decomposition diagram of the LCD of FIG. 6A.

In addition, referring to FIG. 6A and FIG. 6B, FIG. 6A is a schematic cross-sectional view of an LCD 600 according to a sixth embodiment of the present invention. FIG. 6B is a decomposition diagram of the structure of the LCD 600.

The structure of the LCD 600 is similar to the structure of the LCD 400. A difference is the alignment of the axes of the liquid crystal molecules of the second liquid crystal layer 621 in the second viewing angle controller. In the present embodiment, first axes 612 and second axes 622 in the first liquid crystal layer 611 and the second liquid crystal layer 621, respectively are perpendicular to each other. In FIG. 6A and FIG. 6B, the same components as those in the fourth embodiment are denoted by the same numerals. In the sixth embodiment, applying voltages to both the first liquid crystal layer and the second liquid crystal layer at the same time may narrow viewing angles in the top, bottom, left and right orientations.

In the fourth embodiment, if no voltage is applied to the first liquid crystal layer and the second liquid crystal layer, the incident lights that are perpendicularly and not perpendicularly entered into the viewing angle controller will all pass through the fourth and the third polarizers. The view angle is not affected. If a voltage is applied to only one of the first liquid crystal layer or the second liquid crystal layer, some of the incident lights that are not perpendicularly entered into the viewing angle controller will not pass through the third or the fourth polarizers but the incident lights that are perpendicularly entered will not be affected. Therefore, parts of the top and bottom viewing angle are limited. If voltages are applied to both the first liquid crystal layer and the second liquid crystal layer, the limiting effect on the top and bottom viewing angle will be even more obvious and the narrowing effect on the viewing angle will be stronger.

Figure 4C:
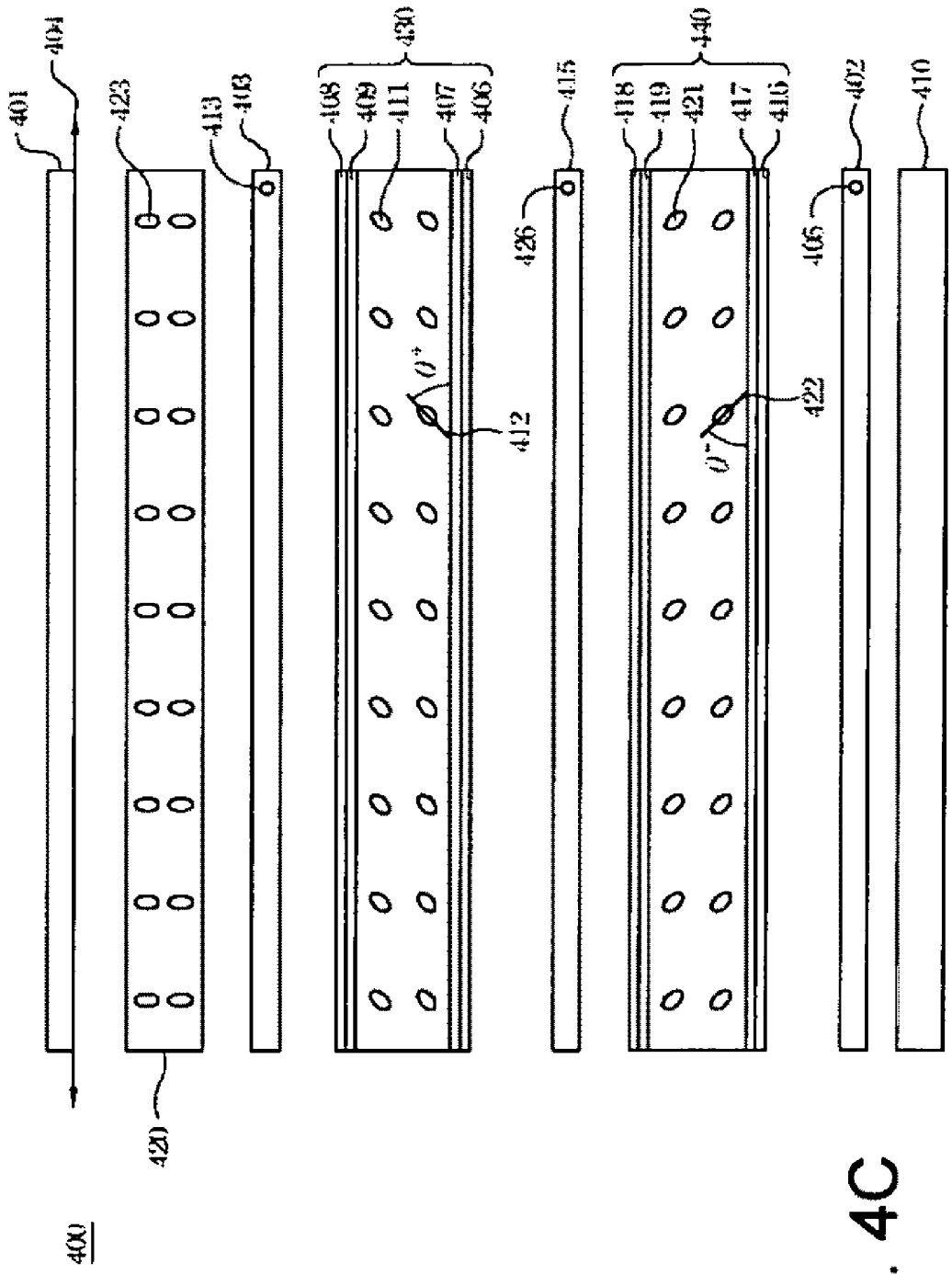
FIG. 4C is a schematic cross-sectional view of the LCD of FIG. 4A when a voltage is applied to the first liquid crystal layer and the second liquid crystal layer.

It should be noted that in the present embodiment, the first liquid crystal layer and the second liquid crystal layer both have a horizontal alignment with a direction toward 0° and 180°. In other words, director axes 412, 422 are both oriented along the 0° and 180° orientation of the horizontal plane. However, the pre-tilt angles of the liquid crystals are not the same but symmetric. For example, when the pre-tilt angle of the first liquid crystal layer is +θ, the pre-tilt angle of the second liquid crystal layer is −θ, as shown in FIG. 4C.

Referring to FIG. 7A to FIG. 7F, FIG. 7A to FIG. 7F are isoluminance contour diagrams of the LCD when different voltages are applied to the viewing angle controller according to the second embodiment and the fifth embodiment of the present invention.

Figure 7A:
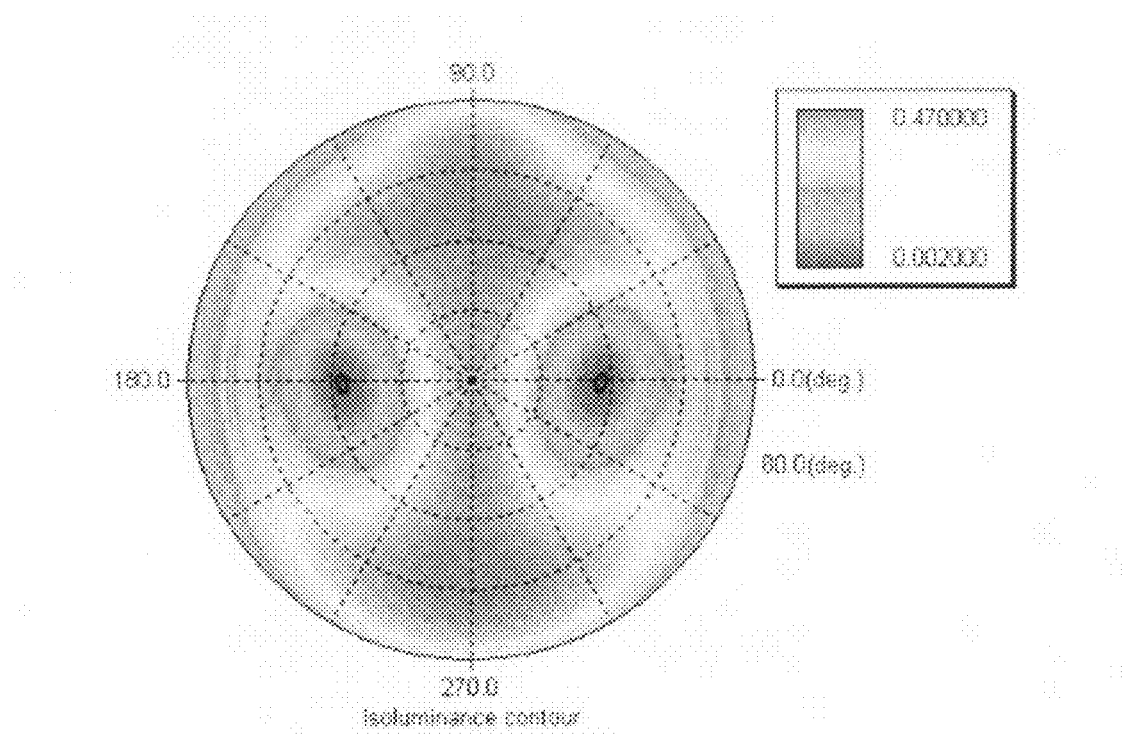
FIGS. 7A to 7F are isoluminance contour diagrams of the LCD according to the second embodiment and the fifth embodiment of the present invention when different voltages are applied by the viewing angle controller.
Figure 7B:
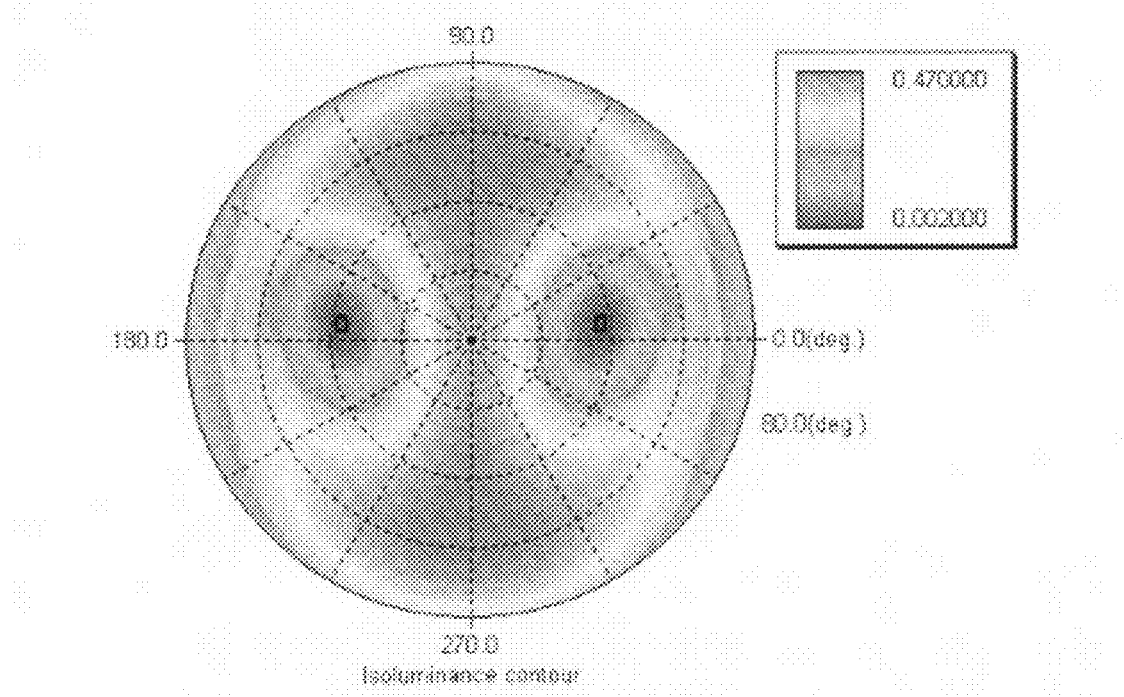
Figure 7C:
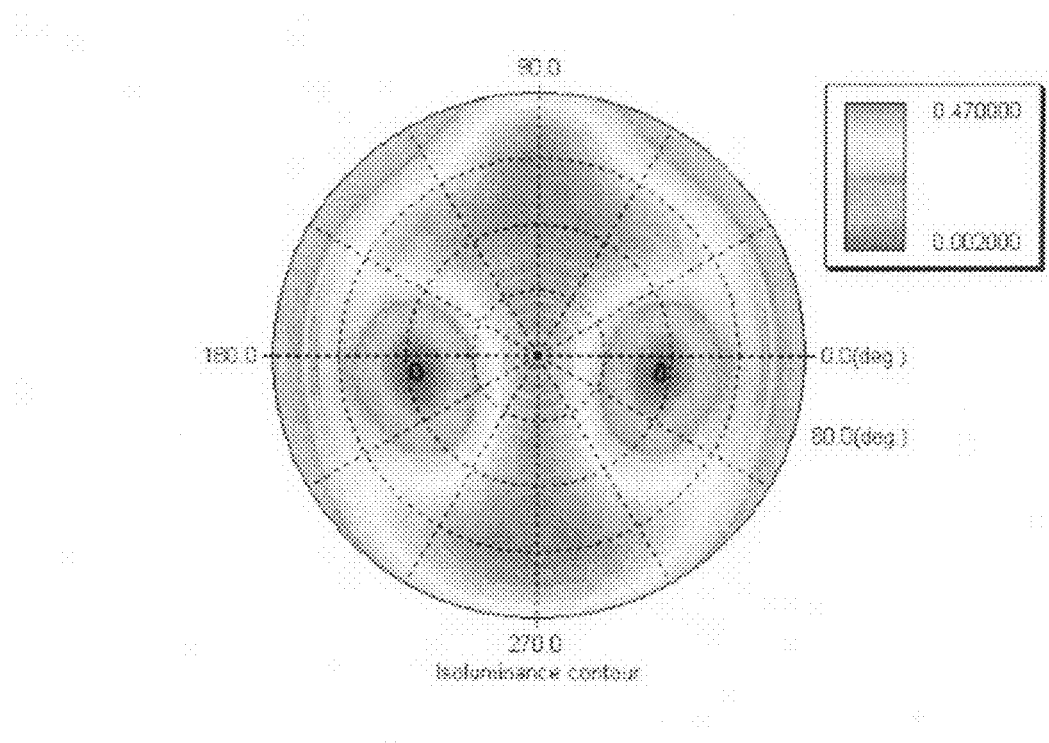

Regarding the second embodiment, there is only one viewing angle controller in the second embodiment. When an appropriate control voltage is applied to the viewing angle controller, for example 2.6V, the viewing angle with lower brightness falls on the 0° and 180° orientation (as shown in FIG. 7A). When a lower voltage is applied to the viewing angle controller, for example 2.4V, the viewing angle with lower brightness is still pinched or narrowed on the 0° and 180° orientation but the lower brightness area shifts toward the top viewing angle (90°), as shown in FIG. 7B. On the contrary, when a higher voltage is applied to the viewing angle controller, for example 2.8V, the viewing angle with lower brightness shift toward the bottom viewing angle (270°), as shown in FIG. 7C.

Figure 7D:
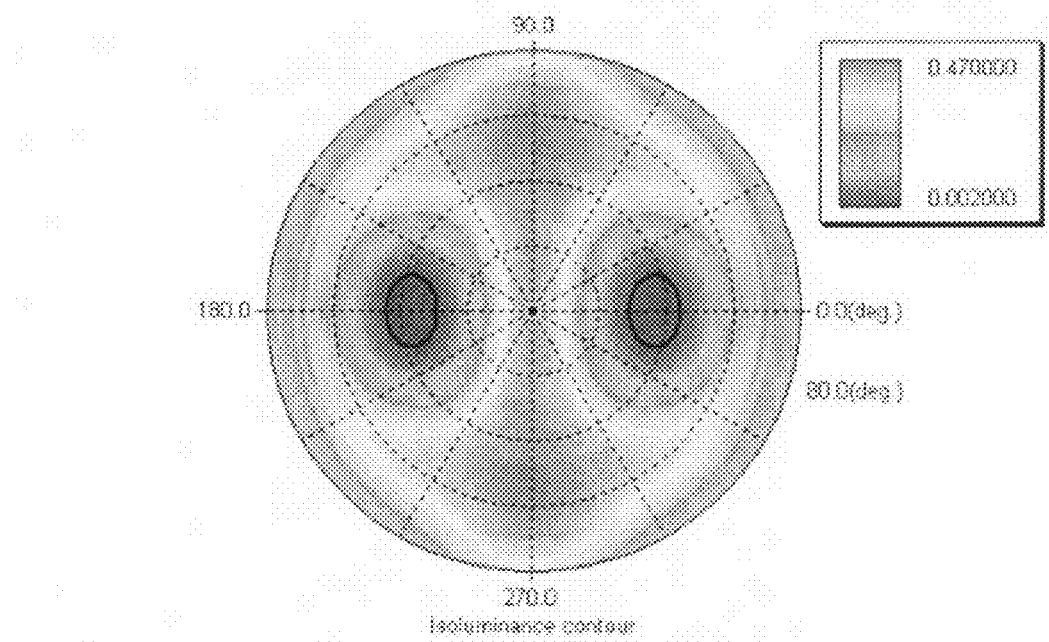
Figure 7E:
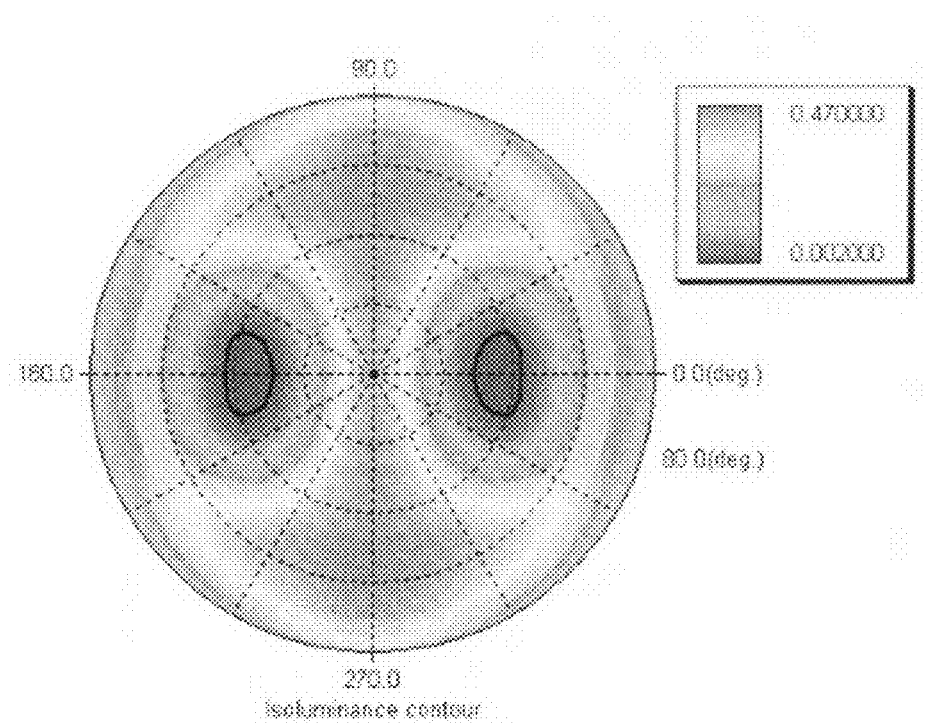
Figure 7F:
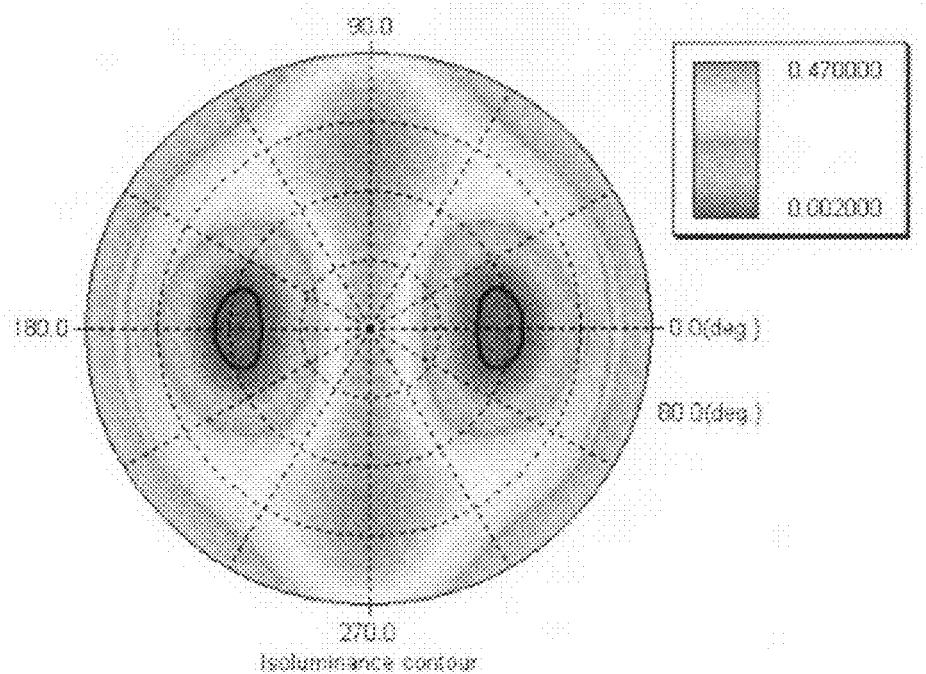

Regarding the fifth embodiment, there are two viewing angle controllers in the fifth embodiment. The pre-tilt angles of the liquid crystals of the two viewing angle controllers are symmetric. Therefore, when appropriate voltages are applied to both viewing angle controllers, for example 2.6V, the isoluminance contour diagram of the fifth embodiment (as shown in FIG. 7D) has a larger area of lower brightness level and a more obvious narrowing effect on the viewing angle, compared to the isoluminance contour diagram of the second embodiment (as shown in FIG. 7A). When higher voltages (as shown in FIG. 7E) or lower voltages (as shown in FIG. 7F) are applied to the two viewing angle controllers, the areas of lower brightness level in the isoluminance contour diagram of the LCD do not shift up or down. Thus, when two viewing angle controllers are used, the display device has a stronger effect on viewing angle narrowing, larger tolerance on voltage controlling, and decreased shifting on the viewing angle narrowing and display quality when control voltage shifts.

Figure 8:
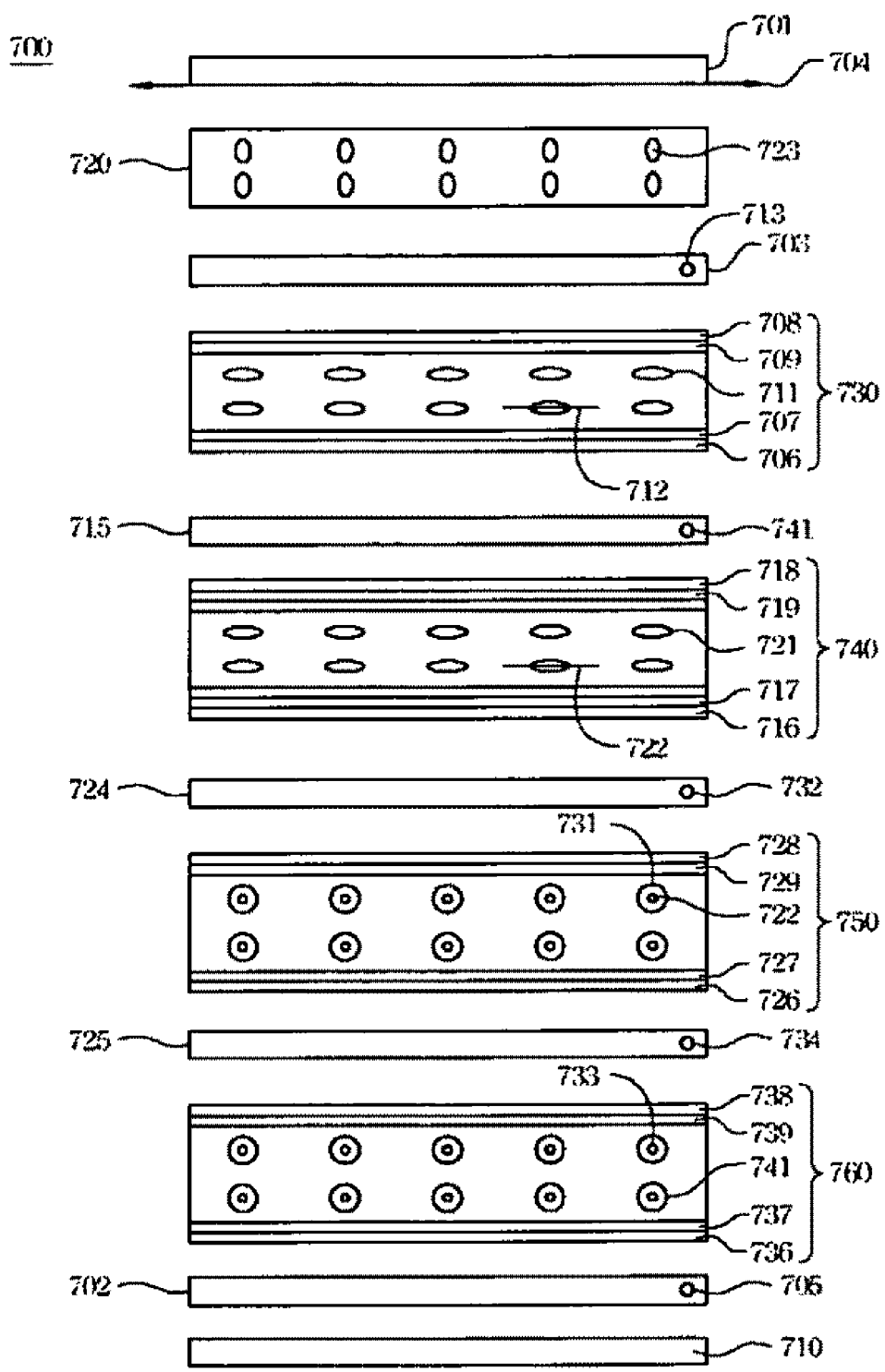
FIG. 8 is a schematic cross-sectional view of an LCD according to the seventh embodiment of the present invention.

Referring to FIG. 8, FIG. 8 is a schematic cross-sectional view of the LCD 700 according to a seventh embodiment of the present invention. The LCD 700 comprises four viewing angle controllers 730, 740, 750, and 760. The viewing angle controllable LCD 700 comprises a back light module 710, a first polarizer 701, a second polarizer 702, an LCD panel 720, a first viewing angle controller 730, a third polarizer 703, a fourth polarizer 715, a second viewing angle controller 740, a third viewing angle controller 750, a fifth polarizer 724, a sixth polarizer 725, and a fourth viewing angle controller 760.

In the present embodiment, the second polarizer 702, the fourth viewing angle controller 760, the sixth polarizer 725, the third viewing angle controller 750, the fifth polarizer 724, the second viewing angle controller 740, the fourth polarizer 715, the first viewing angle controller 730, the third polarizer 703, the LCD panel 720, and the first polarizer 701 are stacked on top of the back light module 710 in sequence.

A first transparent axis 704 of the first polarizer 701 and a second transparent axis 705 of the second polarizer 702 are perpendicular to each other. Transparent axes 713, 741, 732, and 734 of the third, fourth, fifth, and sixth polarizers are all parallel to the second transparent axis 705.

The first viewing angle controller 730, the second viewing angle controller 740, the third viewing angle controller 750, and the fourth viewing angle controller 760 respectively comprise a first liquid crystal layer 711, a second liquid crystal layer 721, a third liquid crystal layer 731, and a fourth liquid crystal layer 741. The liquid crystal molecules of the first liquid crystal layer 711, the second liquid crystal layer 721, the third liquid crystal layer 731, and the fourth liquid crystal layer 741 respectively comprise first axes 712, second axes 722, third axes 732, and fourth axes 742. Two of the axes of the liquid crystal layers may be parallel to the second transparent axis 705, while the other two may be perpendicular to the second transparent axis 705. In the present embodiment, the first axes 712 and the second axes 722 are perpendicular to the second transparent axis 705 and the axes 732 and the axes 742 are parallel to the second transparent axis 705. Therefore, the present embodiment includes advantages of narrowing a viewing angle on the top, bottom, left and right in addition to a larger narrowing area in a single direction and increasing the tolerance of control voltage.

Figure 9A:
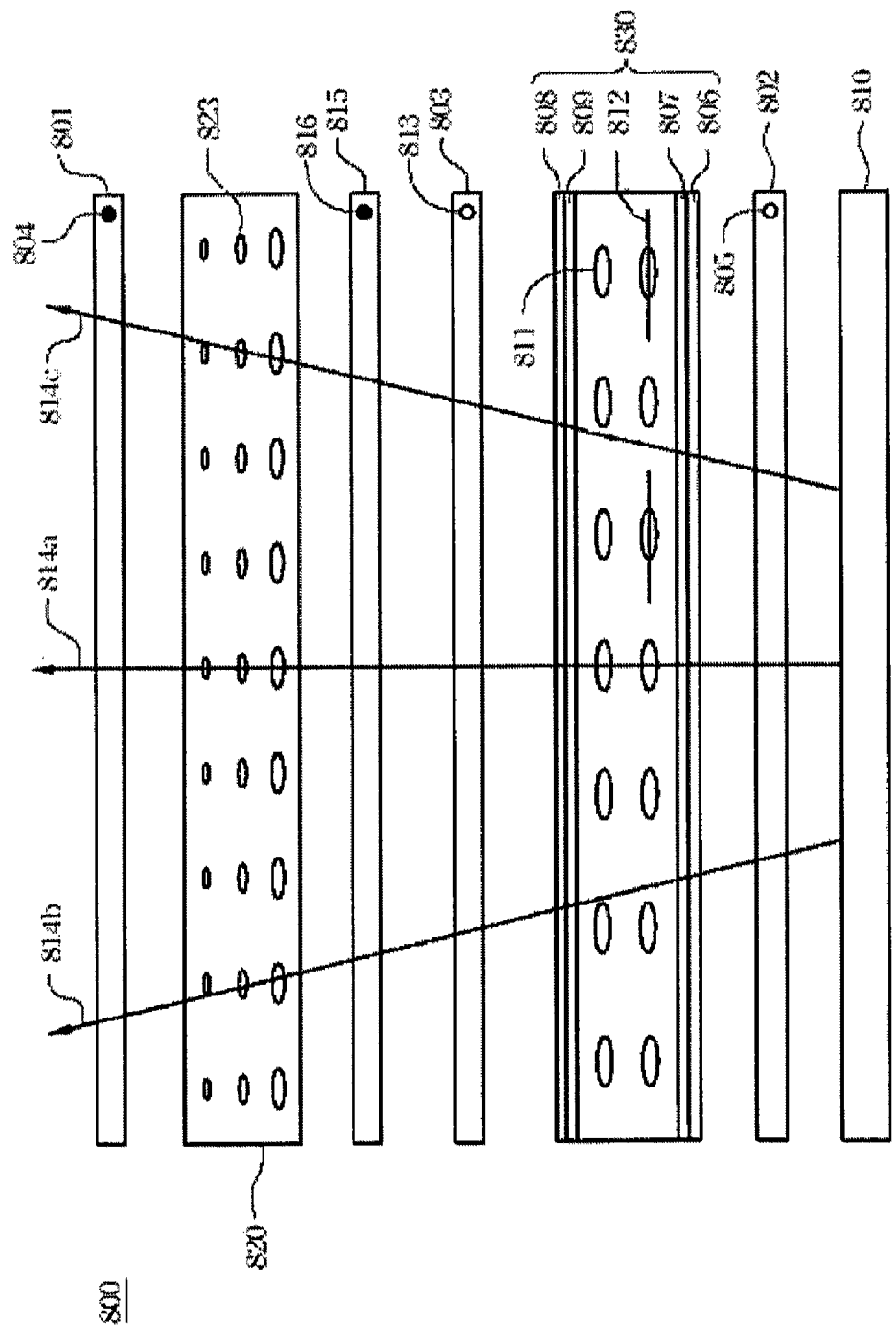
FIG. 9A is a schematic cross-sectional view of an LCD according to the eighth embodiment of the present invention.
Figure 9B:
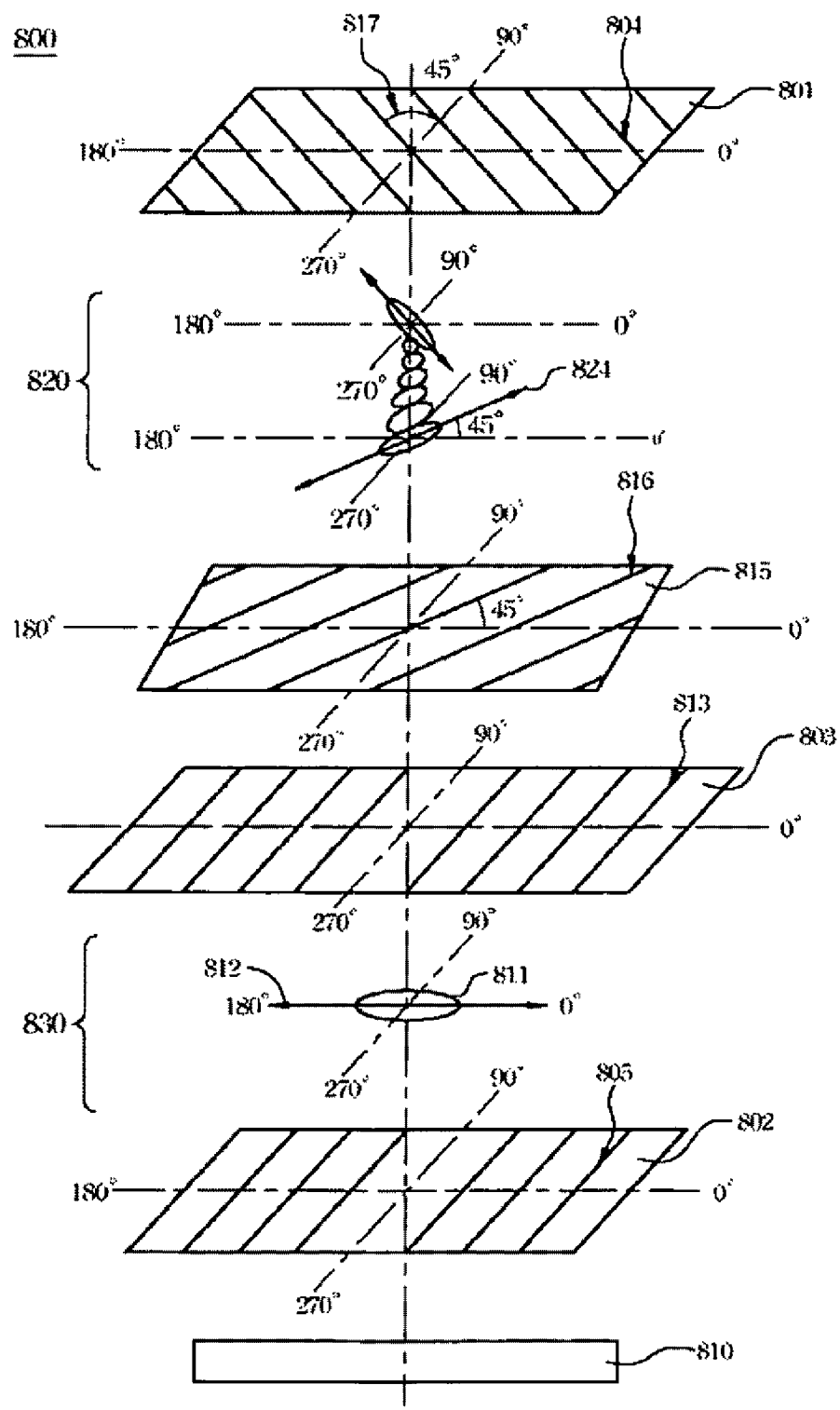
FIG. 9B is a decomposition diagram of the LCD according to the eighth embodiment of the present invention.

Referring to FIG. 9A and FIG. 9B, FIG. 9A is a schematic cross-sectional view of an LCD 800 according to an eighth embodiment of the present invention. FIG. 9B is a decomposition diagram on the structure of the LCD 800.

The structure of the LCD 800 is similar to the structure of the LCD 100. A difference is that their LCD panels use different liquid crystal layers and the first transparent axis 804 of the first polarizer 801 of the LCD 800 forms an acute angle with the second transparent axis 805 of the second polarizer 802. In addition, the LCD 800 further comprises a fourth polarizer 815 which comprises a fourth transparent axis 816 perpendicular to the first transparent axis.

In the present embodiment, the viewing angle controllable LCD 800 comprises a back light module 810, a first polarizer 801, a second polarizer 802, an LCD panel 820, a first viewing angle controller 830, a third polarizer 803 and a fourth polarizer 815. In the present embodiment, the second polarizer 802, the first viewing angle controller 830, the third polarizer 803, the fourth polarizer 815, the LCD panel 820, and the first polarizer 801 are stacked on top of the back light module 810 in sequence.

The first polarizer 801 and the second polarizer 802 are disposed on the back light module 810 and respectively have a first transparent axis 804 and a second transparent axis 805 which form an acute angle 817. The acute angle 817 may be, for example, approximately 45°.

The LCD panel 820 is disposed between the first polarizer 901 and the second polarizer 802. The LCD panel 820 is filled with a twisted nematic liquid crystal layer 823. The first viewing angle controller 830 is disposed between the LCD panel 820 and the second polarizer 802 and has a first homogenous horizontal alignment liquid crystal layer 811 as described in the first embodiment. The liquid crystal molecules of the first liquid crystal layer 811 have first axes 812 which may be generally perpendicular (illustrated as an example in the present embodiment) or parallel (not shown) to the second transparent axis 805. The third polarizer 803 is disposed between the LCD panel 820 and the first viewing angle controller 930 and has a third transparent axis 813 parallel to the second transparent axis 805.

The fourth polarizer 815 is disposed between the LCD panel 820 and the third polarizer 803 and has a fourth transparent axis 816 perpendicular to the first transparent axis 804.

When no voltage is applied to the first liquid crystal layer 811, the axes 812 are generally perpendicular to the second transparent axis 805 so incident lights 814a, 814b, and 814c which are perpendicularly or not perpendicularly entered into the first liquid crystal layer 811 may all pass through the third polarizer 803 and emit to the LCD panel 820. When a voltage is applied to the first liquid crystal layer 811, the axes 812 of the liquid crystal molecules of the first liquid crystal layer would tilt in an angle with respect to the first substrate 806 (i.e. in the vertical plane). As a result, incident lights 814b and 814c which pass through the second polarizer 802 and are not perpendicularly entered into the first liquid crystal layer 811 generate a phase delay and cannot pass through the third polarizer 803. Only an incident light 814a that perpendicularly enters into the first liquid crystal layer 811 may pass through the third polarizer 803 and emit to the LCD panel 820. Consequently, the viewing angle on the top and bottom and the brightness of the LCD 800 (as shown in FIG. 9B at the orientations of 90° and 270° representing top and bottom orientations, respectively) are limited (e.g., pinched or narrowed).

Figure 10:
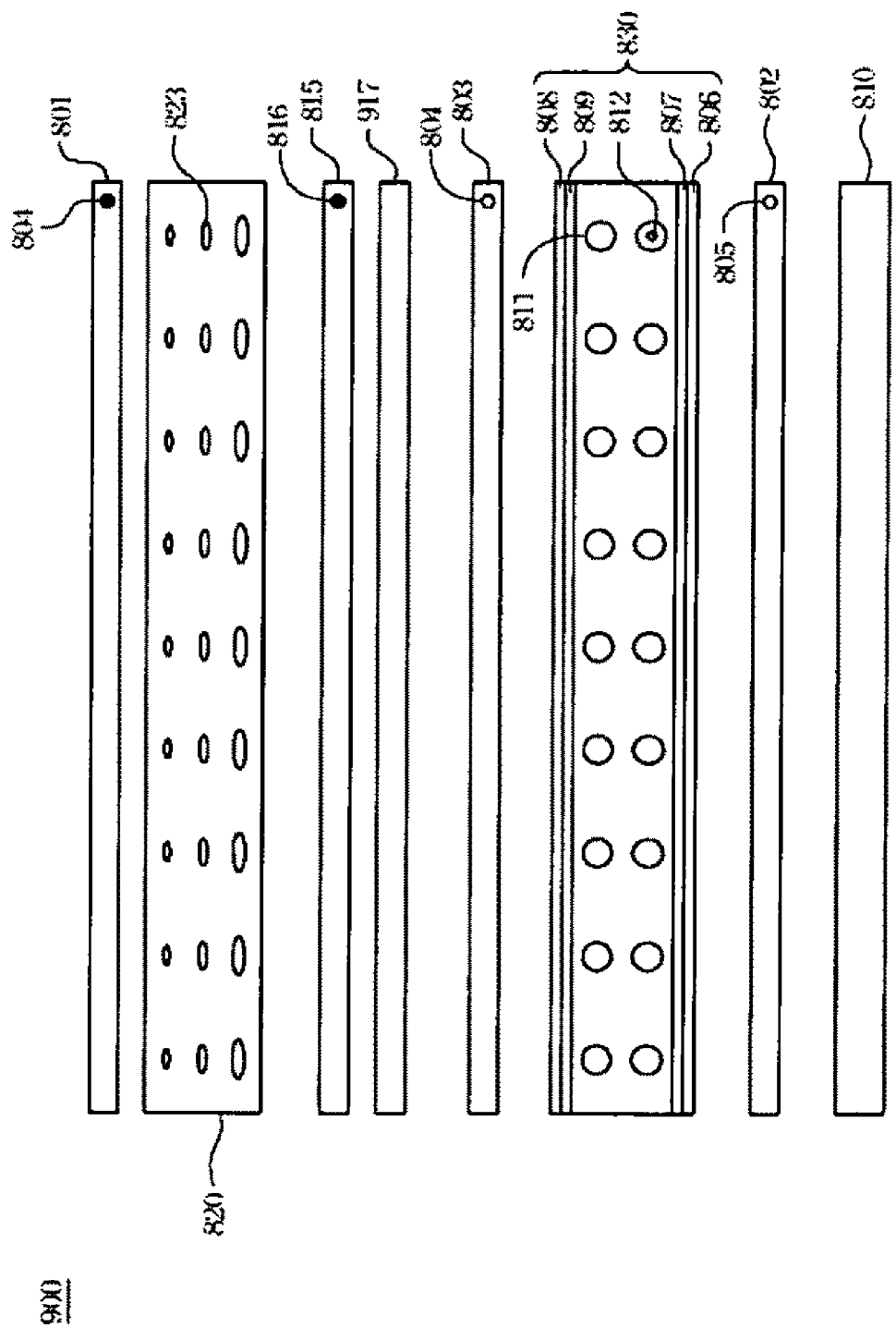
FIG. 10 is a schematic cross-sectional view of an LCD according to the ninth embodiment of the present invention.

In addition, referring to FIG. 10, FIG. 10 is a schematic cross-sectional view of an LCD 900 according to a ninth embodiment of the present invention.

The structure of the LCD 900 is similar to the structure of the LCD 800. A difference is that the LCD 900 further comprises a wave plate 917 disposed between the third polarizer 803 and the fourth polarizer 815. In FIG. 10, the same components as those in the LCD 800 will be denoted by the same numerals. Referring to FIG. 9A, in the LCD 800, the two transparent axes 816 and 804 of the third polarizer 803 and the fourth polarizer 815 form an acute angle which may be 45° in the present embodiment. Thus, after light emitted by a back light source passes through the viewing angle controller 830 and the third polarizer 803, part of the light is absorbed by the fourth polarizer 815 and only part of the light may pass through the fourth polarizer 815. Thus, display brightness is affected. In the LCD 900 of FIG. 10, a wave plate 917 (e.g. a ½π wave plate) is further disposed between the third polarizer 803 and the fourth polarizer 815 which turns the polarizing direction of the polarization light passing through the third polarizer 803 to be of the same direction as the transparent axis 816 of the fourth polarizer 815. Thus, most of the light may pass through the fourth polarizer 815 and enter the LCD panel after emitting from the third polarizer 803. The brightness level is not affected. Therefore, the LCD 900 has a better brightness level than the LCD 800.

Figure 11A:
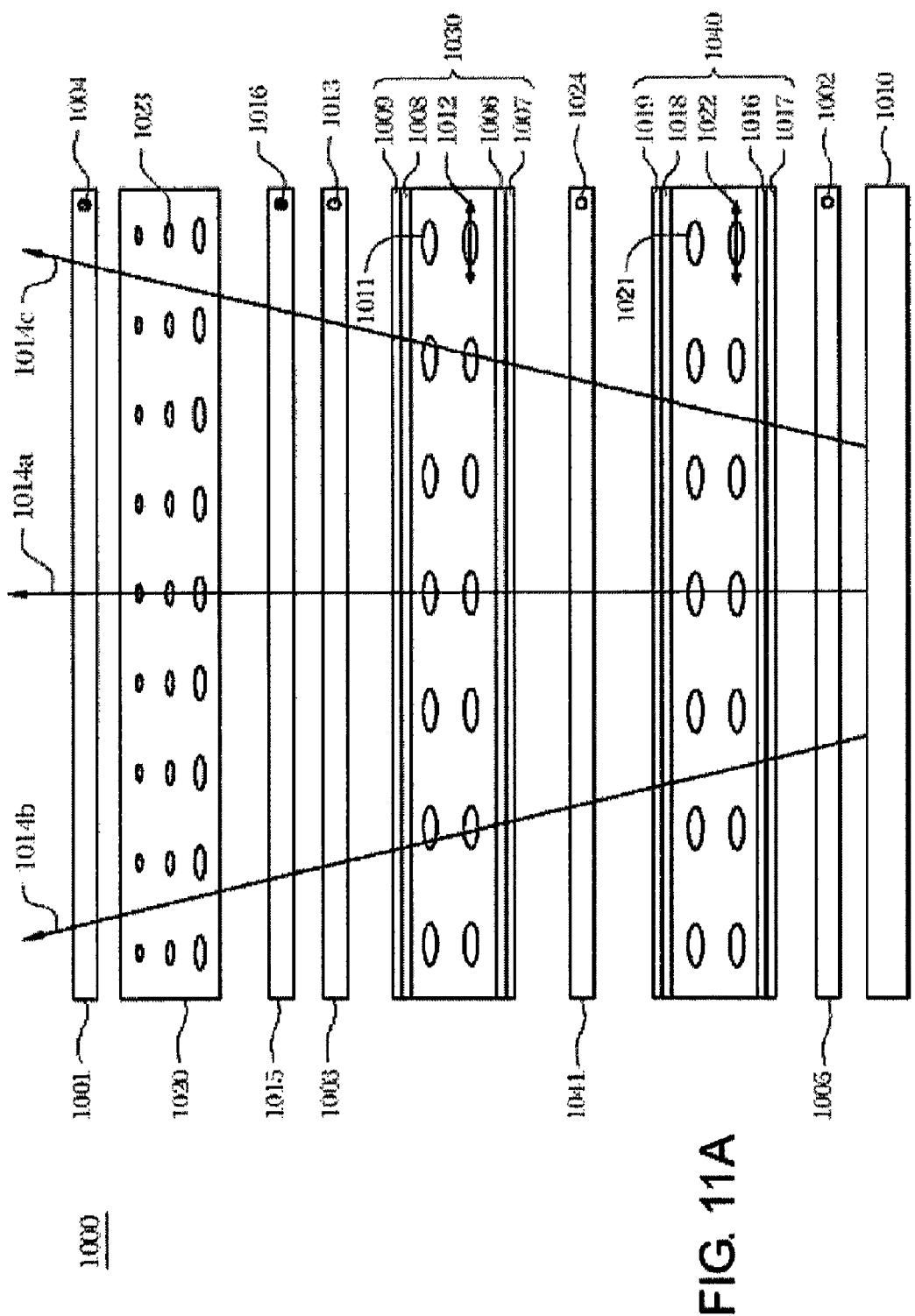
FIG. 11A is a schematic cross-sectional view of an LCD according to the tenth embodiment of the present invention.
Figure 11B:
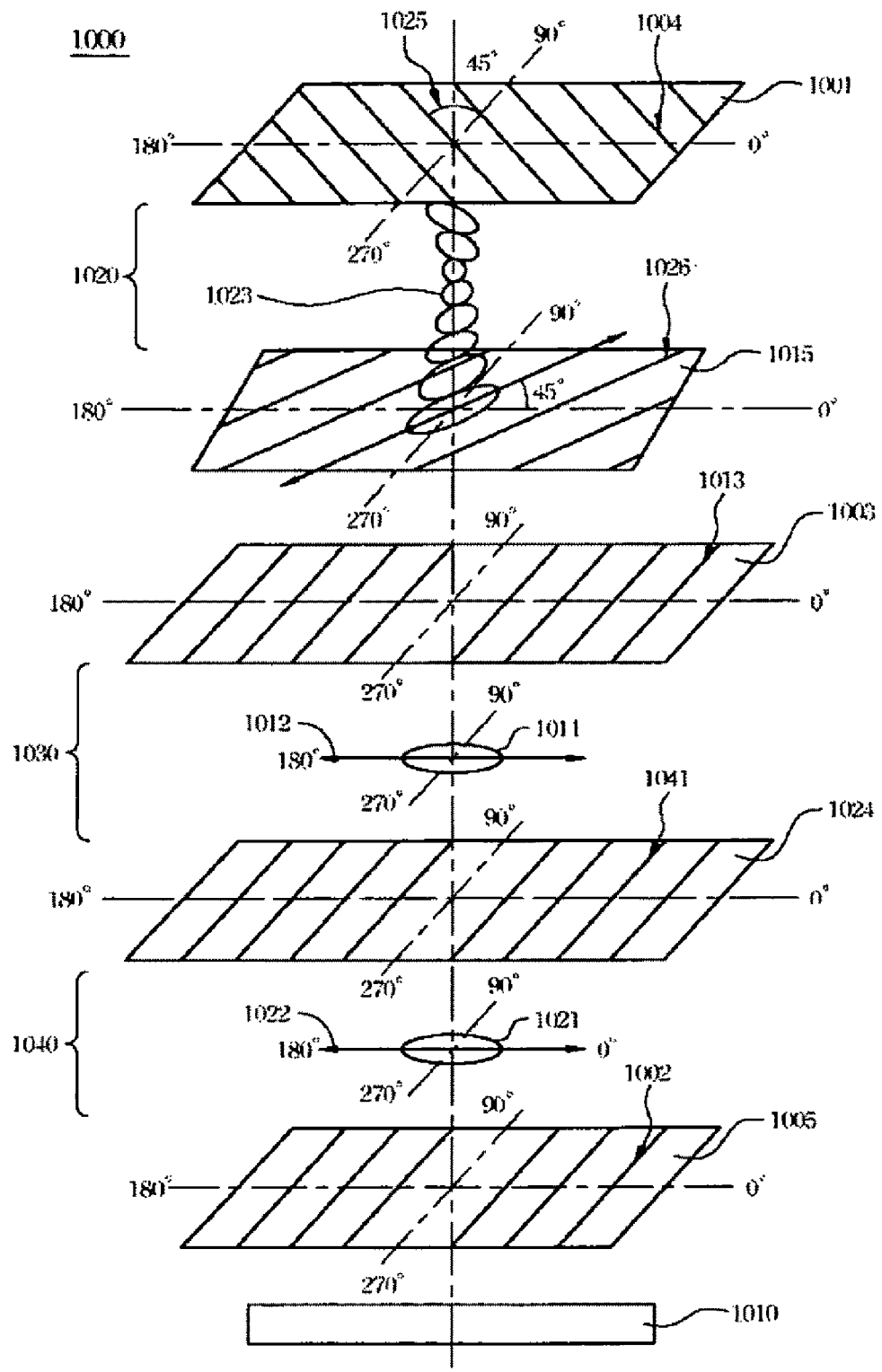
FIG. 11B is a decomposition diagram of the LCD of FIG. 11A.

Referring to FIG. 11A and FIG. 11B, FIG. 11A is a schematic cross-sectional view of an LCD 1000 according to a tenth embodiment of the present invention. FIG. 11B is a decomposition diagram on the structure of the LCD 1000.

The structure of the LCD 1000 is similar to the structure of the LCD 800. A difference is that the LCD 1000 further comprises a second viewing angle controller 1040. The viewing angle controllable LCD 1000 comprises a back light module 1010, a first polarizer 1001, a second polarizer 1005, an LCD panel 1020, a first viewing angle controller 1030, a third polarizer 1003, a fourth polarizer 1015, a second viewing angle controller 1040, and a fifth polarizer 1041. In the present embodiment, the second polarizer 1005, the second viewing angle controller 1040, the fifth polarizer 1041, the first viewing angle controller 1030, the third polarizer 1003, the fourth polarizer 1015, the LCD panel 1020, and the first polarizer 1001 are stacked on top of the back light module 1010 in sequence.

The first polarizer 1001 is disposed on the back light module 1010 and has a first transparent axis 1004. The second polarizer 1005 is disposed between the back light module 1010 and the first polarizer 1001 and has a second transparent axis 1002 which forms an acute angle 1025 with a first transparent axis 1004. The acute angle 1025 may be generally 45°. Transparent axes 1013 and 1024 of the third polarizer 1003 and the fifth polarizer 1041 are parallel to the second transparent axis 1002. A transparent axis 1026 of the fourth polarizer 1015 is perpendicular to the first transparent axis 1004.

Axes 1012 of the liquid crystal molecules of the first liquid crystal layer 1011 are parallel to axes 1022 of the liquid crystal molecules of the second liquid crystal layer 1022. Axes 1012 and 1022 are perpendicular to the second transparent axis 1002 (but may be parallel to the second transparent axis 1002 in another embodiment).

The present embodiment uses two viewing angle controllers and thus, may have a better viewing angle narrowing effect compared to the eighth embodiment. A wave plate may be added between the third polarizer and the fourth polarizer to enhance brightness level in the present embodiment.

Figure 12A:
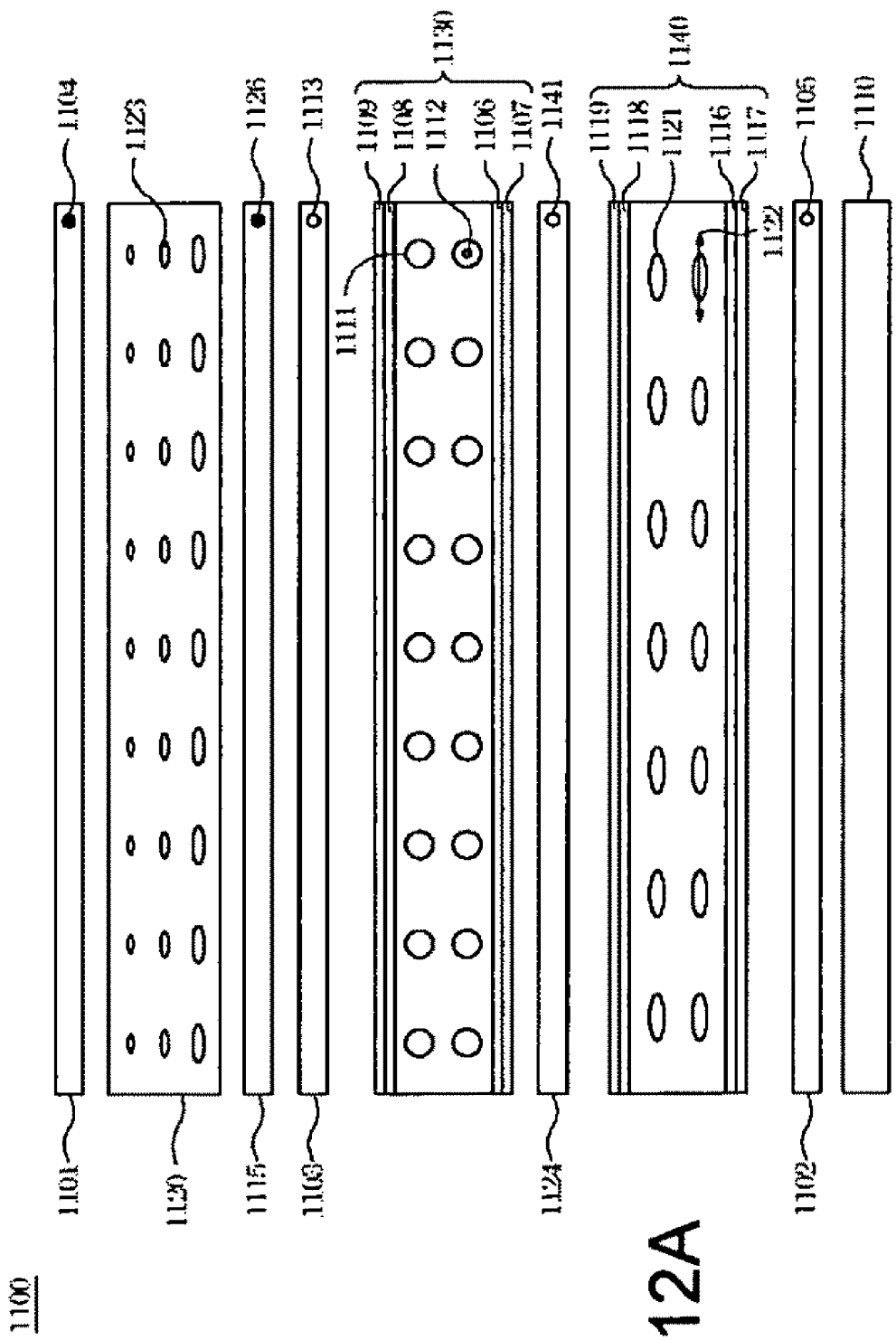
FIG. 12A is a schematic cross-sectional view of an LCD according to the eleventh embodiment of the present invention.
Figure 12B:
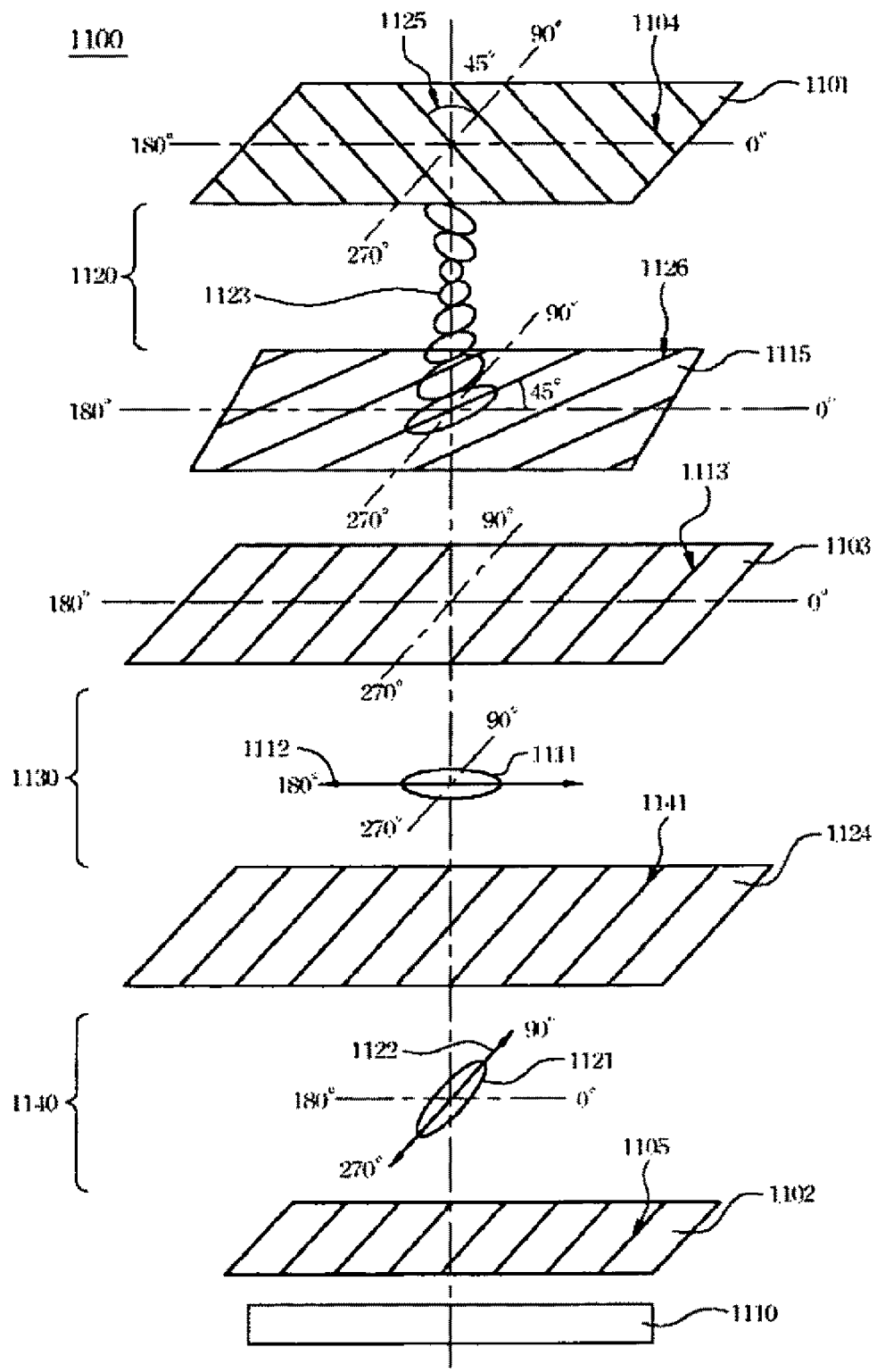
FIG. 12B is a decomposition diagram of the LCD of FIG. 12A.

Referring to FIG. 12A and FIG. 12B, FIG. 12A is a schematic cross-sectional view of an LCD 1100 according to an eleventh embodiment of the present invention. FIG. 12B is a decomposition diagram of the structure of the LCD 1100.

The structure of the LCD 1100 is similar to the structure of the LCD 1000. A difference is the alignment of the axes of the liquid crystal molecules of the second liquid crystal layer. The axes 1122 of the liquid crystal molecules of the second liquid crystal layer are perpendicular to the axes 1112 of the liquid crystal molecules of the first liquid crystal layer. Therefore, the viewing angles in the top, bottom, left, and right orientations may be narrowed at the same time in the present embodiment. A wave plate may be added between the third polarizer 1103 and the fourth polarizer 1115 to enhance brightness level.

According to certain of the above preferred embodiments, the technical features of the present invention lie in the use of at least one viewing angle controller comprising, for example, a homogenous horizontal alignment liquid crystal layer on one side of the LCD panel, at least two polarizers which are disposed respectively on the top and bottom of the viewing angle controller and whose transparent axes are, for example, parallel, and liquid crystal axes parallel or perpendicular to transparent axes. Then, at least one electric field is applied to the liquid crystal layer of the viewing angle controller. As a result, the polarization light not perpendicularly entered into the liquid crystal layer generates a phase delay and cannot pass through the polarizer on the other side of the viewing angle controller so as to achieve narrowing and controlling effects on an LCD display screen. Accordingly, this may solve the problem of the convention technology that arises from the conflict between a wide viewing angle and the issue of user privacy.

Although the present invention has been disclosed above by the preferred embodiments, they are not intended to limit the present invention. Those of ordinary skill in the art will realize modifications and variations may be made without necessarily departing from the spirit and scope of the present invention as represented, for example, in the appended claims.

What is claimed is:

1. A viewing angle controllable liquid crystal display (LCD) comprising:
    a back light module;
    a first polarizer and a second polarizer provided on one side of the back light module and respectively having a first transparent polarization axis and a second transparent polarization axis oriented generally perpendicular to each other;
    an LCD panel, disposed between the first polarizer and the second polarizer;
    a first viewing angle controller, disposed between the LCD panel and the second polarizer and comprising a first liquid crystal layer, wherein liquid crystal molecules of the first liquid crystal layer have first director axes generally parallel to one of the first and second transparent polarization axes; and a third polarizer, disposed between the LCD panel and the first viewing angle controller and having a third transparent polarization axis generally parallel to the second transparent polarization axis;

wherein the first liquid crystal layer includes top and bottom portions and liquid crystal molecules included in the top portion and the liquid crystal molecules included in the bottom portion both have first director axes generally parallel to one of the first and second transparent polarization axes.

2. The LCD according to claim 1, further comprising:
a second viewing angle controller disposed between the second polarizer and the first viewing angle controller and comprising a second liquid crystal layer, wherein liquid crystal molecules of the second liquid crystal layer have second director axes which are generally parallel to the first director axes; and
a fourth polarizer, disposed between the first viewing angle controller and the second viewing angle controller and having a fourth transparent polarization axis generally parallel to the second transparent polarization axis.

3. The LCD according to claim 2, wherein the liquid crystal molecules of the first liquid crystal layer have a first pre-tilt angle, the liquid crystal molecules of the second liquid crystal layer have a second pre-tilt angle, and the first pre-tilt angle and the second pre-tilt angle are in a vertical plane and symmetric about a horizontal plane.

4. The LCD according to claim 2, further comprising:
a third viewing angle controller, disposed between the second polarizer and the second viewing angle controller and comprising a third liquid crystal layer, wherein liquid crystal molecules of the third liquid crystal layer have third director axes which are generally perpendicular to the first director axes;
a fifth polarizer, disposed between the third viewing angle controller and the second viewing angle controller and having a fifth transparent polarization axis generally parallel to the second transparent polarization axis;
a fourth viewing angle controller, disposed between the second polarizer and the third viewing angle controller and comprising a fourth liquid crystal layer, wherein liquid crystal molecules of the fourth liquid crystal layer have fourth director axes which are generally perpendicular to the first director axes; and
a sixth polarizer, disposed between the third viewing angle controller and the fourth viewing angle controller and having a sixth transparent polarization axis generally parallel to the second transparent polarization axis.

5. The LCD according to claim 1, further comprising:
a second viewing angle controller disposed between the second polarizer and the first viewing angle controller and comprising a second liquid crystal layer, wherein liquid crystal molecules of the second liquid crystal layer have second director axes which are generally perpendicular to the first director axes; and
a fourth polarizer, disposed between the first viewing angle controller and the second viewing angle controller and having a fourth transparent polarization axis generally parallel to the second transparent polarization axis.

6. The LCD according to claim 5, further comprising:
a third viewing angle controller, disposed between the second polarizer and the second viewing angle controller and comprising a third liquid crystal layer, wherein liquid crystal molecules of the third liquid crystal layer have third director axes generally parallel to the first director axes;
a fifth polarizer, disposed between the third viewing angle controller and the second viewing angle controller and having a fifth transparent polarization axis generally parallel to the second transparent polarization axis;
a fourth viewing angle controller, disposed between the second polarizer and the third viewing angle controller and comprising a fourth liquid crystal layer, wherein liquid crystal molecules of the fourth liquid crystal layer have fourth director axes which are generally perpendicular to the first director axes; and
a sixth polarizer, disposed between the third viewing angle controller and the fourth viewing angle controller and having a sixth transparent polarization axis generally parallel to the second transparent polarization axis.

7. The LCD according to claim 1, wherein the first viewing angle controller is configured to apply a first voltage to the first liquid crystal layer to tilt the first director axes to restrict the LCD viewing angle in a direction generally parallel to one of the first and second transparent polarization axes.

8. The LCD according to claim 1, wherein the majority of all liquid crystal molecules included in the first liquid crystal layer have director axes generally parallel to one of the first and second transparent polarization axes.

9. A viewing angle controllable liquid crystal display (LCD), comprising:
a back light module;
a first polarizer and a second polarizer provided on one side of the back light module and each respectively having a first transparent polarization axis and a second transparent polarization axis forming an acute angle with each other;
an LCD panel, disposed between the first polarizer and the second polarizer;
a first viewing angle controller, disposed between the LCD panel and the second polarizer and comprising a first liquid crystal layer, wherein liquid crystal molecules of the first liquid crystal layer have first director axes generally parallel to one of the first and second transparent polarization axes;
a third polarizer, disposed between the LCD panel and the first viewing angle controller and having a third transparent polarization axis generally parallel to the second transparent polarization axis; and
a fourth polarizer, disposed between the LCD panel and the third polarizer and having a fourth transparent polarization axis generally perpendicular to the first transparent polarization axis;
wherein the first liquid crystal layer includes top and bottom portions and liquid crystal molecules included in the top portion and the liquid crystal molecules included in the bottom portion both have first director axes generally parallel to one of the first and second transparent polarization axes.

10. The LCD according to claim 9, further comprising a wave plate disposed between the third polarizer and the fourth polarizer.

11. The LCD according to claim 9, wherein the acute angle is generally 45 degrees.

12. The LCD according to claim 11, wherein the wave plate includes a ½π wave plate.

13. The LCD according to claim 9, further comprising:
a second viewing angle controller disposed between the second polarizer and the first viewing angle controller and comprising a second liquid crystal layer, wherein liquid crystal molecules of the second liquid crystal layer have second director axes generally parallel to the first director axes; and a fifth polarizer, disposed between the first viewing angle controller and the second viewing angle controller and having a fifth transparent polarization axis generally parallel to the second transparent polarization axis.

14. The LCD according to claim 13, further comprising:
a third viewing angle controller, disposed between the second polarizer and the second viewing angle controller and comprising a third liquid crystal layer, wherein liquid crystal molecules of the third liquid crystal layer have third director axes which are generally perpendicular to the first director axes;
a sixth polarizer, disposed between the third viewing angle controller and the second viewing angle controller and having a sixth transparent polarization axis generally parallel to the second transparent polarization axis;
a fourth viewing angle controller, disposed between the second polarizer and the third viewing angle controller and comprising a fourth liquid crystal layer, wherein liquid crystal molecules of the fourth liquid crystal layer have fourth director axes which are generally perpendicular to the first director axes; and
a seventh polarizer, disposed between the third viewing angle controller and the fourth viewing angle controller and having a seventh transparent polarization axis generally parallel to the second transparent polarization axis.

15. The LCD according to claim 9, further comprising a second viewing angle controller disposed between the second polarizer and the first viewing angle controller and comprising a second liquid crystal layer, wherein liquid crystal molecules of the second liquid crystal layer have second director axes which are generally perpendicular to the first director axes; and
a fifth polarizer, disposed between the first viewing angle controller and the second viewing angle controller and having a fifth transparent polarization axis generally parallel to the second transparent polarization axis.

16. The LCD according to claim 15, further comprising:
a third viewing angle controller, disposed between the second polarizer and the second viewing angle controller and comprising a third liquid crystal layer, wherein liquid crystal molecules of the third liquid crystal layer have third director axes generally parallel to the first director axes;
a sixth polarizer, disposed between the third viewing angle controller and the second viewing angle controller and having a sixth transparent polarization axis generally parallel to the second transparent polarization axis;
a fourth viewing angle controller, disposed between the second polarizer and the third viewing angle controller and comprising a fourth liquid crystal layer, wherein liquid crystal molecules of the fourth liquid crystal layer have fourth director axes which are generally perpendicular to the first director axes; and
a seventh polarizer, disposed between the third viewing angle controller and the fourth viewing angle controller and having a seventh transparent polarization axis generally parallel to the second transparent polarization axis.

17. A viewing angle controllable liquid crystal display (LCD) comprising:
first and second polarizers respectively having a first polarization axis and a second polarization axis forming a first angle with each other; and
a plurality of first viewing angle controllers coupled to the second polarizer, each comprising a first liquid crystal layer with liquid crystal molecules having a first director axis;
wherein at least one first director axis is generally parallel to one of the first and second polarization axes,
wherein the first liquid crystal layer includes top and bottom portions and liquid crystal molecules included in the top portion and the liquid crystal molecules included in the bottom portion both have first director axes generally parallel to one of the first and second polarization axes.

18. The LCD according to claim 17, further comprising:
a plurality of third polarizers, the number of third polarizers being equal to the number of first viewing angle controllers, each having a third polarization axis generally parallel to the second polarization axis; and
a fourth polarizer having a fourth polarization axis generally perpendicular to the first polarization axis;
wherein the plurality of first viewing angle controllers and the plurality of the third polarizers are alternately stacked and at least one of the first viewing angle controllers is located adjacent to the second polarizer.

19. The LCD according to claim 18, wherein the first angle is an acute angle.

20. The LCD according to claim 17, wherein at least another first director axis is generally perpendicular to the at least one first director axis that is generally parallel to one of the first and second polarization axes.

21. A method including:
applying a first voltage to a first liquid crystal layer included in an LCD display, the first liquid crystal layer disposed between a first polarizer with a first polarization axis and a second polarizer with a second polarization axis not generally parallel to the first polarization axis, to vertically tilt a first director axis of a plurality of liquid display molecules included in the a first liquid crystal layer and narrow the viewable display angle of the LCD display in a first direction,
applying the first voltage to the first liquid crystal layer to vertically tilt the first director axis of the plurality of liquid crystal molecules at a first tilt level and narrow the viewable display angle at a first narrowed location; and
applying additional voltage to the first liquid crystal layer to vertically tilt the first director axis of the plurality of liquid crystal molecules at an additional tilt level and narrow the viewable display angle at an additional narrowed location.

22. The method of claim 21 including:
applying a second voltage to a second liquid crystal layer included in the LCD display, the second liquid crystal layer disposed between the first polarizer and the second polarizer, to vertically tilt a second director axis of the plurality of liquid display molecules included in the second liquid crystal layer and narrow the viewable display angle of the LCD display in a second direction.

23. The method of claim 22 including applying the second voltage to the second liquid crystal layer to narrow the viewable display angle of the LCD display in a second direction that is not generally parallel to the first direction.

* * * * *